United States Patent [19]

Nishioka et al.

[11] Patent Number: 4,947,042
[45] Date of Patent: Aug. 7, 1990

[54] TUNNEL UNIT AND SCANNING HEAD FOR SCANNING TUNNELING MICROSCOPE

[75] Inventors: Tadashi Nishioka; Takao Yasue; Hiroshi Koyama, all of Itami, Japan

[73] Assignee: Mitsubishi Denki Kabushiki Kaisha, Japan

[21] Appl. No.: 366,175

[22] Filed: Jun. 14, 1989

[30] Foreign Application Priority Data

Dec. 13, 1988 [JP] Japan .................................. 63-312825
Mar. 13, 1989 [JP] Japan .................................... 1-57809

[51] Int. Cl.$^5$ ............................................. H01J 37/26
[52] U.S. Cl. .................................. 250/306; 250/442.1
[58] Field of Search .............................. 250/306, 442.1

[56] References Cited

U.S. PATENT DOCUMENTS 4,837,445 6/1989 Nishioka et al. ................. 250/442.1

OTHER PUBLICATIONS

O. Marti et al., "Atomic Resolution Atomic Force Microscopy of Graphite and the Native Oxide on Silicon", Mar./Apr. 1988, pp. 287-290.
J. Schneir et al., "Tunneling Microscopy, Lithography, and Surface Diffusion on an Easily Prepared, Atomically Flat Gold Surface", Feb. 1988 pp. 718-721.

Primary Examiner—Jack I. Berman
Attorney, Agent, or Firm—Leydig, Voit & Mayer

[57] ABSTRACT

A tunnel unit for a scanning tunneling microscope includes a specimen stage having a plurality of pole pieces joined together via a joint member formed of a non-magnetic material and a specimen placing surface where the pole pieces and the joint member are exposed, a permanent magnet rotatably inserted within the specimen stage and at the joint of the plurality of pole pieces, a scanning head main body, which is provided with a piezoelectric element fixed thereto and a probe mounted on the piezoelectric element, being disposed above the specimen placing surface of the specimen stage and extending across the exposed joint member, and three screws formed of a magnetic material and rotatably mounted on the scanning head main body, the screws having their end portions in contact with the specimen placing surface of the specimen stage for supporting the scanning head main body above the specimen placing surface.

42 Claims, 23 Drawing Sheets

FIG. IF
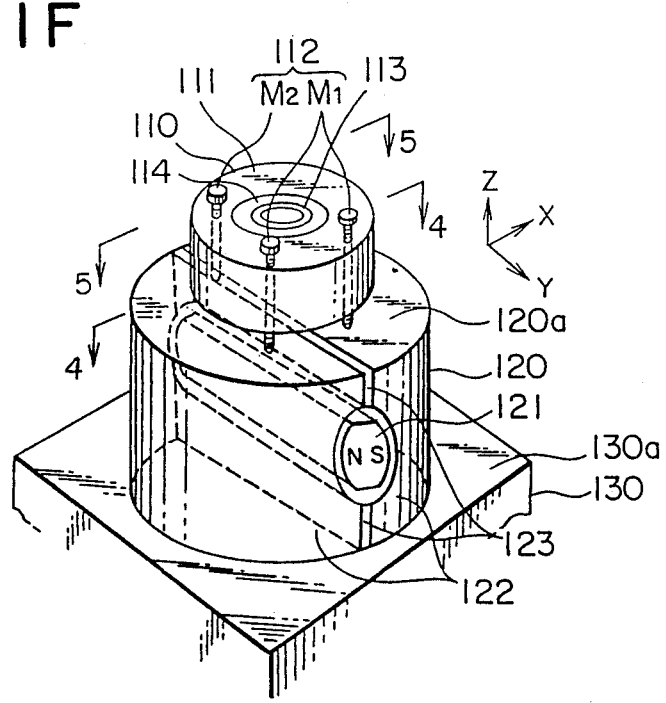
FIG. IG
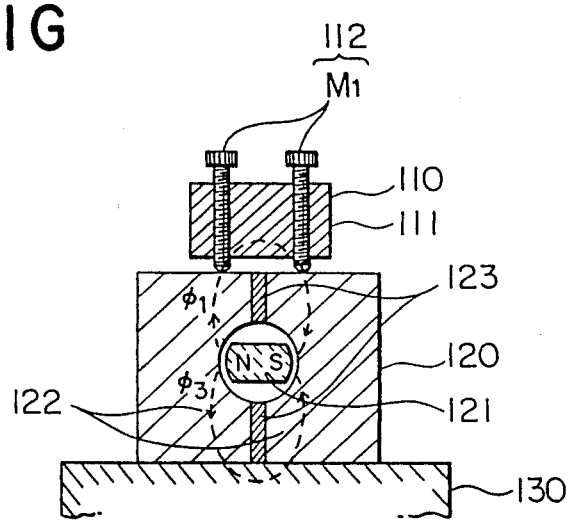

TUNNEL UNIT AND SCANNING HEAD FOR SCANNING TUNNELING MICROSCOPE

BACKGROUND OF THE INVENTION

1. Field of the Invention

The present invention relates to a tunnel unit for a scanning tunneling microscope (hereinafter referred to as an "STM") and, more particularly, to a tunnel unit for a microscope of this type that has a coarse adjustment mechanism in which the scanning head is supported by the use of screws at three points.

The present invention also relates to a scanning head used in a tunnel unit for an STM.

2. Description of the Related Art

Tunnel units for STMs that have a coarse adjustment mechanism, in which a scanning head having a probe mounted on a piezoelectric element is supported at three points by three screws provided through a specimen stage, are disclosed in, for instance, (1) J. Schneir, R. Sonnenfeld, O. Marti, P. K. Hansma, J. E. Demuth and R. J. Hamers, "J. Appl. Phys.", Vol. 63, No. 3, pp 717 to 721, 1988, and (2) O. Marti, B. Drake, S. Gould and P. K. Hansma, "J. Vac. Sci. Technol. A.", Vol. 6, No. 2, pp 287 to 290, 1988. Tunnel units according to these disclosures are shown in FIGS. 14A and 14B. As shown in these figures, each tunnel unit has a scanning head 110 and a specimen stage 120. The scanning head 110 is provided with a piezoelectric element 113 capable of serving as a fine adjustment mechanism, and a probe 115 mounted on the piezoelectric element 113. On the other hand, the specimen stage 120 is provided with three screws 112 whose ends project from the surface of the stage 120 on which specimens, such as a specimen 124, may be placed. The scanning head 110 is disposed upon the ends of the three screws 112. When the screws 112 are advanced or retracted by suitably rotating them, the space between the probe 115 provided on the scanning head 110 and the specimen 124 placed on the specimen stage 120 is adjusted. An opening 10a for observing the probe 115 is formed through a side portion of the scanning head 110. The adjustment of the space between the probe 115 and the specimen 124 is performed while the tip portion of the probe 115 is observed through the opening 10a and at a magnified scale achieved by using a magnifier.

However, the rigidity of the tunnel unit is inadequate if the scanning head 110 is simply disposed upon the three screws 112. To overcome this problem, the tunnel unit has, e.g., the following arrangement. That is, springs 129 are provided between the scanning head 110 and the specimen stage 120 to apply tensile force between these members, as shown in FIG. 14A, or spherical permanent magnets 119 are mounted on the ends of the screws 112 and, simultaneously, the scanning head 110 is formed of a magnetic body, as shown in FIG. 14B, thereby causing attraction by virtue of the magnetic force.

The conventional tunnel units, however, encounter the following problems.

In a tunnel unit in which the springs 129 are used to pull the scanning head 110 and the specimen stage 120 toward each other, the springs 129, which must be disassembled and reassembled each time the probe 115, the specimen 124 or the like is replaced, lead to inconvenience. Particularly when springs 129 having a large spring constant are used or when a plurality of springs 129 are used in order to enhance the rigidity of the tunnel unit, the disassembly and reassembly of the springs 129 may cause the scanning head 110 to become inclined or subjected to impact, often resulting in the probe 115 coming into contact with the specimen stage 120, the specimen 124, or other associated parts, thereby damaging the probe 115, the specimen 124, or the like.

Furthermore, a tunnel unit in which the spherical permanent magnets 119 are used involves the risk that, when the scanning head 110 is being disposed on the specimen stage 120, these members may be abruptly attracted to each other by the magnetic force, damaging the probe 115, the specimen 124, or the like. Also, because permanent magnet materials having a large coercive force, such as Alnico and ferrite, are in general hard and brittle, they can only be machined with difficulty. It is therefore difficult to machine such a material to assume a spherical configuration and, hence, to provide it with a low level of surface roughness at least at the part where it is to come into contact with the scanning head 110. Another problem is that, if a sintered magnet material is used, voids or cavities tend to be formed in the spherical surface after surface machining, while if permanent magnets in which a plastic material is charged with needle-shaped particles of an iron-cobalt alloy are used, they may encounter such problems as surface wear, a low level of rigidity, and a large coefficient of thermal expansion.

The formation of the opening 10a in the scanning head 110 involves the following problem. If any sound waves should propagate from the outside of the tunnel unit into the scanning head 110 through the opening 10a, they may directly propagate to the piezoelectric element 113. In such cases, there is a risk of electric noise being generated. An STM of the type being discussed employs tunnel current which is about 1 nA and is thus very small relative to the bias voltage applied between the probe 115 and the specimen 124, which is about 20 mV Therefore, if any electromagnetic waves should propagate from the outside into the scanning head 110 through the opening 10a, there is a risk of a great deal of electric noise being generated. Possible causes of electromagnetic waves entering the scanning head 110 include high voltage applied to the deflection electrode of a CRT combined with the STM to display, using the tunnel current, images of the surface of the specimen 124 for observation thereof. In order to prevent any sound waves or electromagnetic waves from entering, observation has hitherto been conducted, with the scanning head 110 covered with a case formed of a plastic or metal material. However, if the specimen 124 has to be observed while such a case is covering the scanning head 110, the efficiency of an observation operation deteriorates greatly.

SUMMARY OF THE INVENTION

The present invention has been accomplished in order to overcome the above-described problems, and an object of the present invention is to provide a tunnel unit for a scanning tunneling microscope which possesses a high level of mechanical rigidity and which allows the probe, the specimen and other associated parts to be replaced safely and easily.

Another object of the present invention is to provide a scanning head for a scanning tunneling microscope which is capable of reducing the possibility of electric noise being generated, and of ensuring an operation of excellent efficiency.

A tunnel unit for a scanning tunneling microscope according to the present invention comprises: a specimen stage having a plurality of pole pieces joined together via a joint member formed of a non-magnetic material, and a specimen placing surface where the plurality of pole pieces and the joint member are exposed; a permanent magnet rotatably inserted within the specimen stage and at the portion at which the plurality of pole pieces are joined; a scanning head main body disposed above the specimen placing surface of the specimen stage in such a manner as to extend across the exposed joint member; a piezoelectric element fixed to the scanning head main body; a probe mounted on the piezoelectric element; and screw means formed of a magnetic material and turnably mounted on the scanning head main body, the screw means having its end portions in contact with the specimen placing surface of the specimen stage such as to support the scanning head main body above the specimen placing surface of the specimen stage.

The tunnel unit for a scanning tunneling microscope may further comprise: an auxiliary stage having a plurality of auxiliary-stage pole pieces joined together via an auxiliary-stage joint member formed of a non-magnetic material, and a specimen stage disposing surface where the plurality of auxiliary-stage pole pieces and the auxiliary-stage joint member are exposed; and an auxiliary-stage permanent magnet rotatably inserted within the auxiliary stage and at the portion at which the plurality of auxiliary-stage pole pieces are joined, the specimen stage being disposed upon the specimen stage disposing surface of the auxiliary stage.

A scanning head for a scanning tunneling microscope according to the present invention comprises: a scanning head main body having an opening formed therein for observation; a piezoelectric element fixed to the scanning head main body and disposed inside the scanning head main body; a probe mounted on the piezoelectric element and disposed in the vicinity of the opening of the scanning head main body; and an observation window body provided in the opening of the scanning head main body in such a manner as to close the opening, the observation window body being optically transparent and capable of preventing the inside of the scanning main body from being subjected to external disturbance.

BRIEF DESCRIPTION OF THE DRAWINGS

FIG. 1F is a perspective view showing the operating state of the tunnel unit in accordance with the first embodiment;

FIG. 1G is a sectional view taken along the line IV—IV shown in FIG. 1F;

DESCRIPTION OF THE PREFERRED EMBODIMENTS

Embodiments of the present invention will be described hereunder with reference to the accompanying drawings.

Figure 1A:
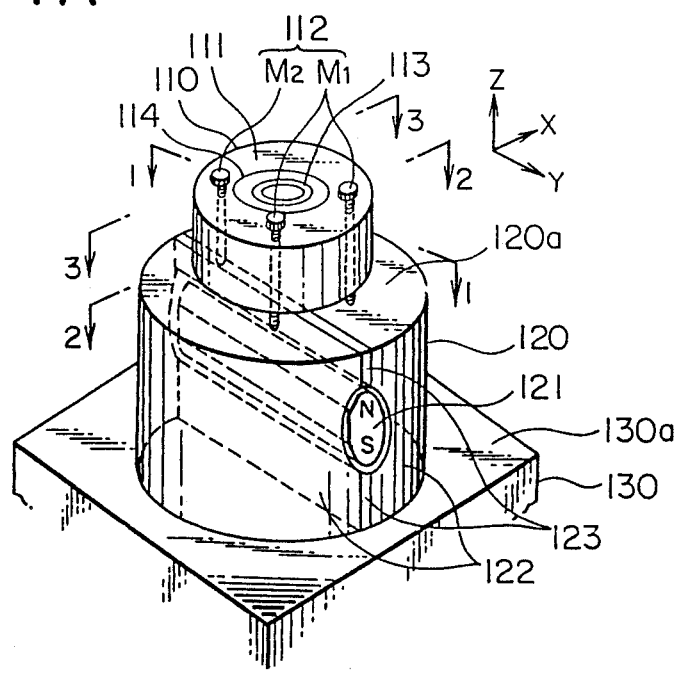
FIG. 1A is a perspective view of a tunnel unit for an STM, in accordance with a first embodiment of the present invention.

Referring to FIG. 1A, a tunnel unit in accordance with a first embodiment of the present invention has a specimen stage 120 disposed upon a unit base 130, and a scanning head 110 disposed upon the specimen stage 120.

The unit base 130 is formed of a material having strong magnetic properties, and has a specimen stage disposing surface 130a which is horizontal.

The specimen stage 120 is formed of a material having a high magnetic permeability, and has two pole pieces 122 each having the configuration that can be obtained by longitudinally bisecting a circular cylinder. These pole pieces 122 are joined to each other via joint members 123 formed of a non-magnetic material to form one circular cylinder. The lower end face of this circular cylinder is disposed on the specimen stage disposing surface 130a of the unit base 130, while the upper end face defines a specimen placing surface 120a.

A circular hole is formed at the joint of the two pole pieces 122, and the circular hole extends horizontally along the plane of joint. A permanent magnet 121 is rotatably received within the circular hole. The permanent magnet 121 has a configuration obtained by cutting portions of a round bar on two opposite sides by equal amounts, thereby providing flat cut-surfaces. The permanent magnet 121 is magnetized in the direction of the line connecting two circular arcs described by the remaining portions that are not cut. The flat cut-surfaces are provided in order to reduce the level of leakage of magnetic flux.

Figure 1B:
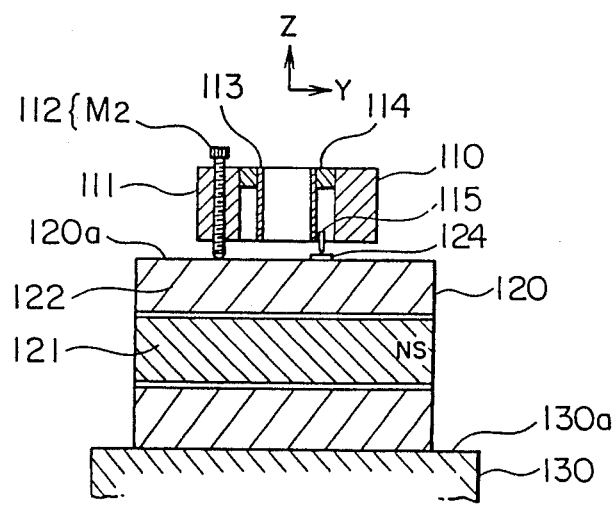
FIG. 1B is a sectional view taken along the line I—I shown in FIG. 1A.

The scanning head 110 is formed of a material having a high magnetic permeability, and it has a circular cylindrical scanning head main body 111 in which a through hole extending from the upper surface to the lower surface is formed in the vicinity of the center. A circular cylindrical piezoelectric element 113 is received within the through hole formed in the scanning head main body 111. As shown in FIG. 1B, the upper end portion of the piezoelectric element 113 is fixed to the inner wall of the through hole of the scanning head main body 111 by a fixing member 114 having electrically insulating properties. A probe 115 is mounted on a lower end portion of the piezoelectric element 113.

Figure 1C:
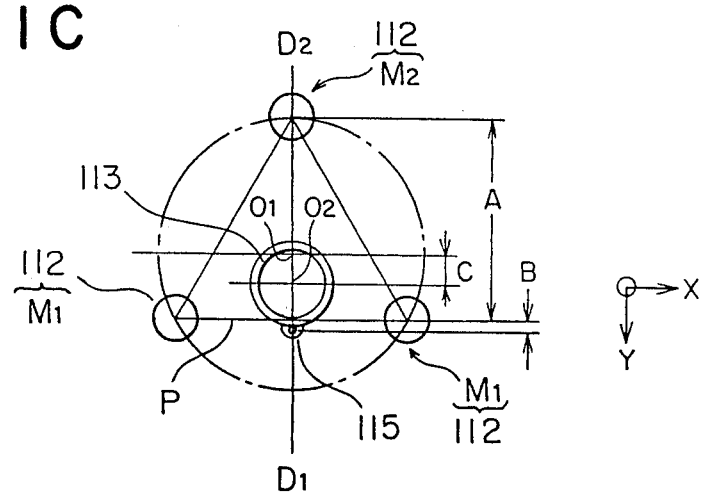
FIG. 1C is a view showing the arrangement in which three screws and a probe of the tunnel unit are disposed in a plane.

Referring to FIG. 1A, three screws 112 are provided in the scanning head main body 111 at predetermined intervals around the circumference of the main body 111, and these screws 112 are threaded into the scanning head main body 111 by passing therethrough from the upper surface to the lower surface. The screws 112 are formed of a material having a high magnetic permeability. As shown in FIG. 1C, these three screws 112 are disposed in a plane (X-Y plane) at positions which define an equilateral or isosceles triangle. Also, if two screws 112 positioned at either end of the base P of the isosceles (or equilateral) triangle formed by the three screws 112 are called M1, while the other screw 112 is called M2, both the center of the piezoelectric element 113 and that of the probe 115 are positioned on a straight line D1-D2 passing through the screw M2 and perpendicular to the base P of the isosceles triangle. In particular, the probe 115 is disposed at a position which is deviated from the base P of the isosceles triangle by a short distance B. The end portion of each screw 112 that projects downward from the lower surface of the scanning head main body 111 is in contact with the specimen placing surface 120a of the specimen stage 120, thereby allowing the scanning head main body 111 to be located above the specimen placing surface 120a of the specimen stage 120, together with the piezoelectric element 113 and the probe 115. The length by which each screw 112 projects from the lower surface of the scanning head main body 111 can be adjusted by rotating the screw 112.

Although not shown, the piezoelectric element 113 is provided with a plurality of electrodes for enabling the probe 115 to perform three-dimensional fine scanning. Further, the tunnel unit is connected to various circuits such as a power source for applying voltage to these electrodes, a bias voltage source for applying voltage between the probe 115 and the specimen concerned, a feedback circuit operative to detect the tunnel current flowing between the probe 115 and the specimen and to maintain the tunnel current at a set value, and a display capable of displaying images of the surface of the specimen for observation.

Next, the operation of the first embodiment will be described. First, as shown in FIG. 1A, the permanent magnet 121 is set at a rotational position thereof at which the line connecting the N and S poles of the permanent magnet 121 parallel with the plane of joint of the two pole pieces 122. Subsequently, as shown in FIG. 1B, a specimen 124 is mounted on the specimen placing surface 120a of the specimen stage 120 and on one of the joint members 123 which is exposed on this specimen placing surface 120a. Thereafter, the specimen stage 120 with the specimen 124 is disposed upon the specimen stage disposing surface 130a of the unit base 130.

Figure 1D:
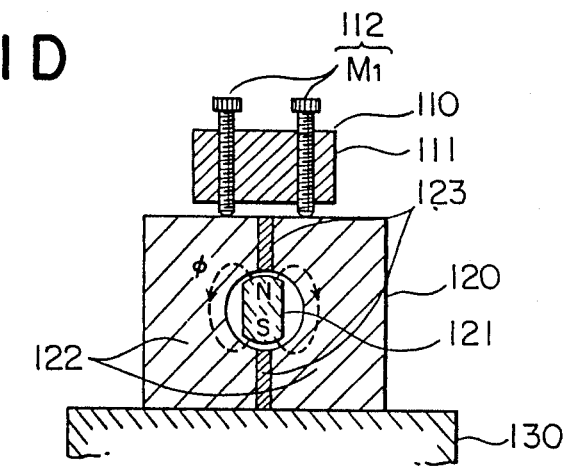
FIG. 1D is a sectional view taken along the line II—II shown in FIG. 1A.
Figure 1E:
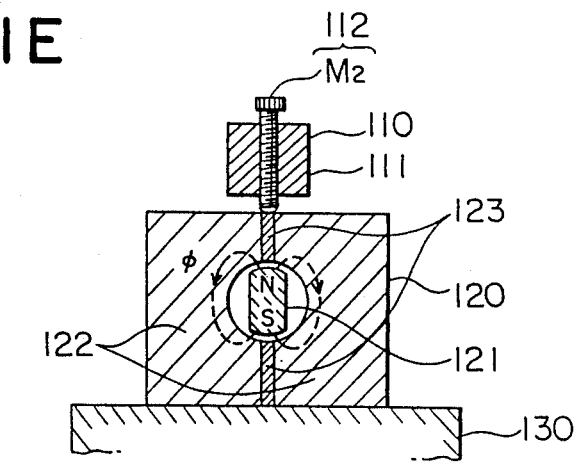
FIG. 1E is a sectional view taken along the line III—III shown in FIG. 1A.

Subsequently, the scanning head 110 is disposed upon the specimen placing surface 120a of the specimen stage 120 in such a manner that the tip of the probe 115 is positioned immediately above the specimen 124. At this time, the two M1 of the three screws 112 provided in the scanning head 110 are positioned on either side of the joint member 123 exposed on the specimen placing surface 120a of the specimen stage 120, while the other screw M2 is positioned on the exposed joint member 123. The height of the three screws 112 must be previously adjusted in order to prevent the tip of the probe 115 from either coming into contact with or becoming excessively far from the specimen 124 when the scanning head 110 is disposed upon the specimen placing surface 120a. Also at this time, as shown in FIGS. 1D and 1E, the magnetic flux $\phi$ flowing from the permanent magnet 121 flows substantially solely within the pole pieces 122. Consequently, no magnetic attraction occurs between the specimen stage 120 on one hand, and the unit base 130 or the scanning head 110 on the other. Thus, there is no risk of any magnetic attraction occurring abruptly when the specimen stage 120 is being disposed upon the unit base 130 or when the scanning head 110 is being disposed upon the specimen stage 120, thereby preventing the probe 115, the specimen 124 or the like from becoming damaged. The above-described state in which the magnetic flux φ flowing from the permanent magnet 121 flows substantially solely within the pole pieces 122 will hereafter be referred to as the "open state of the magnetic circuit".

Figure 1H:
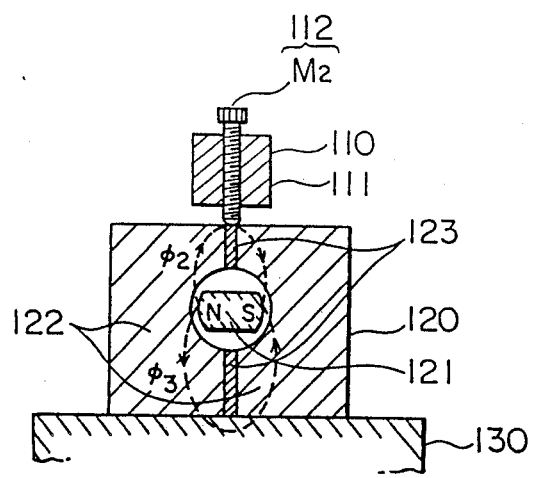
FIG. 1H is a sectional view taken along the line V—V shown in FIG. 1F.
Figure 1I:
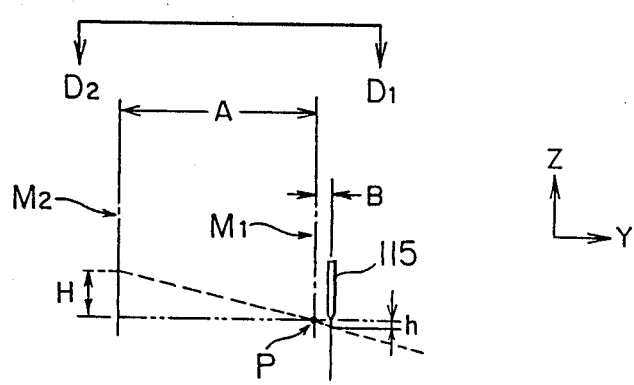
FIG. 1I is a view illustrating positional relationships in the tunnel unit in accordance with the first embodiment.

Thereafter, as shown in FIG. 1F, the permanent magnet 121 is rotated in such a manner that the line connecting the N and S poles becomes normal to the plane of joint of the two pole pieces 122. With this state, three kinds of magnetic flux flow from the permanent magnet 121, as shown in FIGS. 1G and 1H. That is, magnetic flux $\phi 1$ flows through the two screws M1, the scanning head main body 111, and the pole pieces 122, magnetic flux $\phi 2$ flows through the other screw M2 and the pole pieces 122, and magnetic flux $\phi 3$ flows through the unit base 130 and the pole pieces 122. Consequently, strong magnetic attraction occurs between the specimen stage 120 and the unit base 130 and between the specimen stage 120 and the scanning head 110, thereby achieving a highly rigid tunnel unit. The above-described state in which the magnetic flux φ flows in this way from the permanent magnet 121 to the screws 112 of the scanning head 110 and to the unit base 130 will hereafter be referred to as the "closed state of the magnetic circuit".

Thereafter, the screw M2 is rotated in such a manner as to bring the tip of the probe 115 close to the surface of the specimen 124. As has been described before referring to FIG. 1C, the probe 115 is separated the distance B from the base P of the isosceles triangle formed by the three screws 112. Therefore, if the distance from the base P to the screw M2 is called A ($>$B), as will be understood referring to FIG. 11 showing positional relationships in a vertical plane (Y-Z plane), when the screw M2 is rotated to provide a vertical difference H, the base P connecting the two screws MI acts as the fulcrum of the vertical movement of the probe 115 through a vertical difference h which is reduced at a ratio substantially equal to the ratio B/A. This reduction ratio is determined by the distance C, shown in FIG. 1C, between the center 01 of the scanning head 111 and the center 02 of the circular cylindrical piezoelectric element 113 on which the probe 115 is mounted. Thus, the reduction ratio can be set at any desired value during manufacture of the tunnel unit.

A certain bias voltage is applied between the probe 115 and the specimen 124 to which the probe 115 has been brought close in this way. While the probe 115 is caused to perform two-dimensional (X-Y) scanning by the action of the piezoelectric element 113, the screw M2 is rotated to bring the probe 115 closer to the specimen 124. When the tunnel current flowing between the probe 115 and the specimen 124 have reached a set value, the feedback circuit is actuated and feedback control with respect to the electrode that is provided in the piezoelectric element 113 in the Z direction is effected in such a manner as to maintain the tunnel current at the set value while the probe 115 performs scanning in the Z direction. The thus obtained X-Y scanning amount and the Z-direction feedback amount are displayed on the display, so that images of the surface of the specimen 124 are displayed for observation.

Figure 2A:
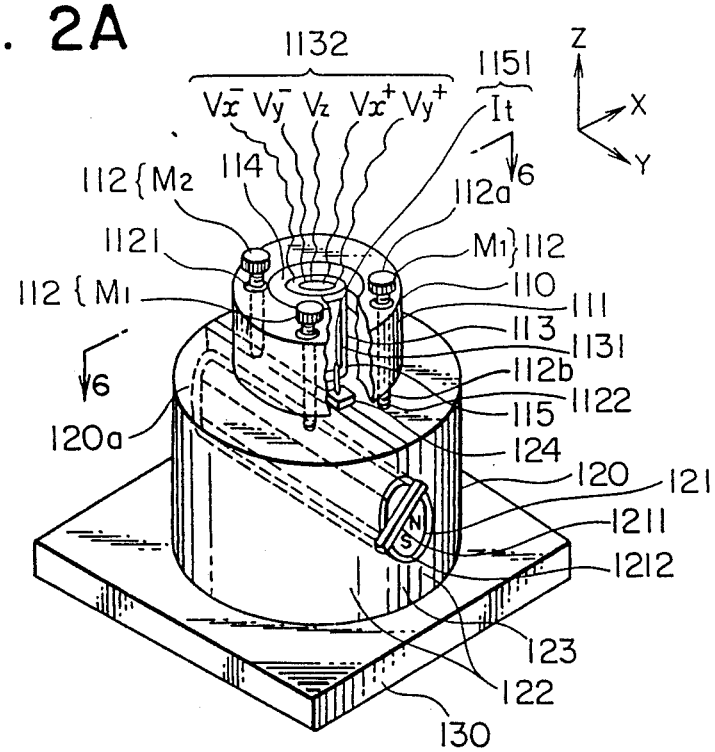
FIG. 2A is a partially cutaway perspective view of a tunnel unit in accordance with a second embodiment.

Referring next to FIG. 2A, there is shown a tunnel unit in accordance with a second embodiment of the present invention.

According to this embodiment, an internally threaded collar 1121 formed of a non-magnetic material is provided in a scanning head main body 111, and the collar 1121 is in threaded engagement with the one M2 of three screws 112 that is positioned on an exposed joint member 123. Also in this embodiment, a metal sphere 1122 is provided at the end 112b of each of the screws 112 which are in contact with a specimen placing surface 120a. A plurality of electrodes 1131 are provided on the inner and outer peripheral surfaces of a circular cylindrical piezoelectric element 113, and the electrodes 1131 are connected to a plurality of leads 1132. A probe 115 is connected to a lead 1151. Further, a permanent magnet 121 has a handle 1211 provided on one end thereof for causing the rotation of the permanent magnet 121. The permanent magnet 121 is received within a circular hole formed in pole pieces 122, with a lubricant 1212 being provided between the magnet 121 and the circular hole.

Next, the tunnel unit of the second embodiment will be described in detail concerning the materials, the dimensions, etc. of members thereof.

A material which has a small coefficient of thermal expansion, strong magnetic properties, and a high magnetic permeability may be used to form the scanning head main body 111. For instance, Invar (Fe: 64%, Ni: 36%) which exhibits a thermal expansion coefficient of $2\times 10^{-6}/°$ C. or less at a temperature between 30° and 100° C., or super-Invar (Fe: 63%, Ni: 32%, Co: 5%) which exhibits a thermal expansion coefficient of $1.3\times 10^{-6}/°$ C. or less at a temperature within the above-mentioned range may be used.

The three screws 112 are formed from a material in which lead (Pb) or sulphur (S) is added to pure iron (Fe) in order to improve mechanical characteristics such as hardness and cutting properties. Each of the screws 112 may be, for instance, a unified fine thread (JIS B 0208) having an outer diameter of 174 in., a pitch p of 0.3175 mm, and 80 threads per inch. An example which may be used as the metal sphere 1122 provided at the end 112b of each of the screws 112 is a steel sphere (JIS B 1501) of 3/16 in. which is prepared for use in a ball bearing. Such a steel sphere is mounted onto each screw 112 by caulking the sphere into a recess formed at the end 112b of the screw 112. The internally threaded collar 1121 associated with the screw M2 positioned on the joint member 123 is formed of a non-magnetic material such as brass (Cu: 70%, Zn: 30%), and the collar 1121 is fixed in place by fitting it within the scanning head main body 111. Internal threads associated with the other two screws M1 that are not positioned on the joint member 123 are formed directly in the scanning head main body 111.

A material which may be used to form the piezoelectric element 113 is, for instance, lead titanic zirconia (Pb(Zr—Ti)O$_3$) having a piezoelectric deformation constant d $=-200\times 10^{-12}$ m/V, and a Curie temperature of about 200° C. The electrodes 1131 comprise electrodes provided on the outer peripheral surface of the circular cylindrical piezoelectric element 113 and divided into four parts parallel to the axis of the circular cylinder, and an electrode provided on the entire inner peripheral surface of the element 113. These electrodes are formed by baking of silver or electroless plating of nickel to a thickness of, e.g., about 3 μm. The leads 1132 comprise leads for applying, during two-dimensional (X-Y) scanning, triangular-wave voltages Vx+, Vx−, Vy+, and Vy− to the fourparts electrodes provided on the outer peripheral surface of the piezoelectric element 113, and a lead for applying, during scanning in the Z direction, a voltage Vz to the electrode provided on the inner peripheral surface of the piezoelectric element 113. These leads are connected to the corresponding electrodes by means of, e.g., a neutral solder containing resin. The fixing member 114 provided to fix the piezoelectric element 113 to the scanning head main body 111 is formed using an epoxy resin having thixotropic properties for the purpose of preventing any sagging of the liquid, and an aromatic-amine based hardener.

The probe 115 is formed of a piece of wire, having a diameter of 0.25 mm, of tungsten (W) or a platinum-iridium (Pt: 90%- Ir: 10%) alloy, with the tip of the wire sharpened by mechanical machining or electrolytic polishing. The probe 115 is mounted on one end of the piezoelectric element 113.

When the piezoelectric element 113 on which is mounted the probe 115 is to be fixed to the scanning head main body 111 by the fixing member 114, the arrangement of the pertinent members in the X-Y plane is, for example, as follows. The three screws 112 are disposed in such a manner as to define an equilateral triangle within a pitch circle of 50 mm $\phi$, and the probe 115 is disposed in such a manner that its tip is outward of the triangle and is separated from the base P of the triangle by a distance of 3.5 mm measured on the perpendicular bisector of the base P connecting the two screws M1. With this arrangement, since the height A of the triangle (shown in FIG. 1C) =37.5 mm, and the distance B between the probe 115 and the base P (also shown in FIG. 1C) =3.5 mm, the reduction ratio h/H (shown in FIG. 11) is substantially equal to the ratio B/A=0.093. As a result, when the screw M2 is rotated through 360°, the probe 115 is vertically moved through p×(B/A)=0.03 mm, whereas, when the screw M2 is rotated through 360°/72 (i.e., 5°), the probe 115 is vertically moved through 0.4 μm (i.e., 4000 Å). In this way, if the piezoelectric element 113 used comprises a circular cylinder having an outer diameter =12 mm, an inner diameter=10 mm, a wall thickness W=1 mm, and a length L=40 mm, and is formed of a piezoelectric material having a piezoelectric deformation constant $d = -200 \times 10^{-12}$ m/V, when the unit voltage is applied to the outer and inner walls of the piezoelectric element 113, a displacement sensitivity d×L/W=80 Å/V is achieved. This means that, the application of the voltage Vz of ±100 V causes the tip of the probe 115 to be displaced through ±8000 Å, which displacement is sufficient to enable the tunnel current flowing in the probe 115 to be detected and controlled by the feedback circuit.

A material which may be used to form the permanent magnet 121 is a precipitation hardened magnetic alloy such as anisotropic Alnico 8 (Al, Ni, Co, Ti, Fe). The magnetic properties of the magnet 121 are represented by a coercive force of 110 KA/m, a residual magnetization of 0.9 T, and the maximum energy product of 40 KJ/m$^3$. The pole pieces 122 are formed using a material having a high magnetic permeability, such as magnetic soft iron (Fe) or low-silicon steel (Si: 1 to 1.5 %, the remainder comprising Fe). The joint members 123 are formed from a brazing solder such as brass (Cu: 70 %, Zn: 30 %). The handle 1211, which is provided to rotate the permanent magnet 121 and to prevent any disengagement of the magnet 121 from the pole pieces 122, is formed of, for instance, a plastic material and is fixed to one end face of the permanent magnet 121 by means of an epoxy resin adhesive. A material which may be used as the lubricant 1212 is a material having a relatively high viscosity such as grease, and such a material is used to always maintain a certain gap between the permanent magnet 121 and the pole pieces 122. The unit base 130 is formed of, for instance, an 18-chrome stainless steel (Cr: 18%, Fe: 82 %) which is a strongly magnetic material.

The tunnel unit in accordance with the second embodiment operates in the associated STM in the same manner as the tunnel unit of the first embodiment.

Figure 2B:
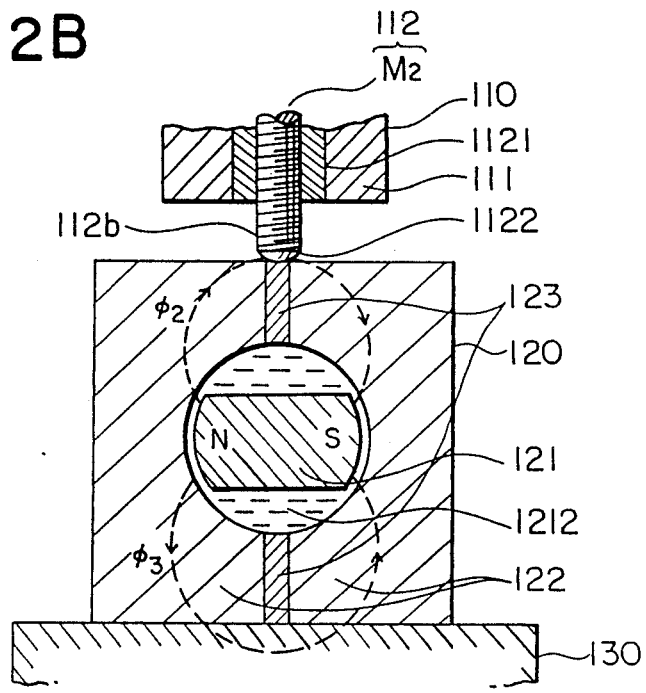
FIG. 2B is a sectional view taken along the line VI—VI shown in FIG. 2A.

According to the second embodiment, because the nonmagnetic, internally threaded collar 1121 is used as the internal thread associated with the screw M2, and because the metal spheres (1122) are mounted at the ends (112b) of the corresponding screws 112, the following advantageous effects are provided. First, the three screws 112 are allowed to come into point-contact with the specimen placing surface 120a of the specimen stage 120 through the metal spheres 1122, thereby achieving a large reduction in the level of play of each screw 112 when it is being rotated. Further, since the screw M2 is threaded into the nonmagnetic, internally threaded collar 1121, the magnetic flux $\phi 2$ flowing from the permanent magnet 121 while the magnetic circuit is closed does not pass through the internally threaded collar 1121, but it passes only through the pole pieces 122 and the metal sphere 1122 provided at the end of the screw M2, as shown in FIG. 2B. As a result, the external and internal thread portions around the screw M2 are prevented from being attracted to each other by the magnetic force, thereby allowing the screw M2 to be manually rotated, thus enabling the tip of the probe 115 to be smoothly brought close to the specimen 124.

Figure 3A:
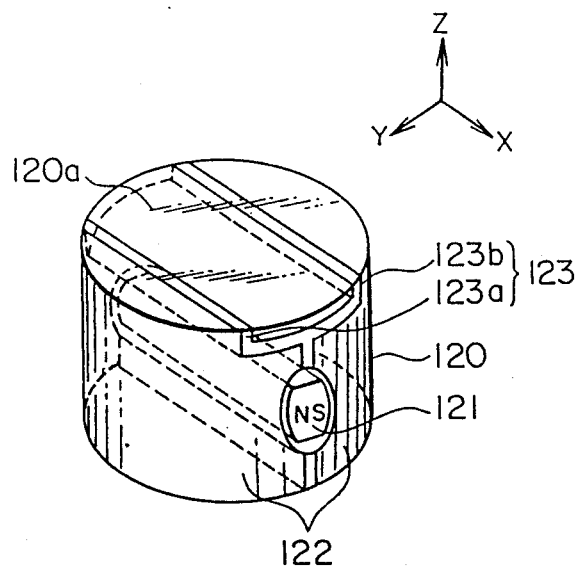
FIG. 3A is a perspective view of a specimen stage used in a third embodiment.

FIG. 3A shows a specimen stage 120 of a tunnel unit in accordance with a third embodiment. In this third embodiment, pole pieces 122 comprise first and second pieces each having the configuration obtained by longitudinally bisecting a circular cylinder, and a third piece having the configuration of a flat plate, these first to third pieces being joined together via joint members 123. The first and second pieces constituting the pole pieces 122 have, in the upper portions thereof, a pair of steps opposing each other. These steps define a recess, within which the third piece is disposed. With this arrangement, therefore, two parallel parts 123a and 123b of one of the joint members 123 are exposed on a specimen placing surface 120a. Two M1 of screws 112 are positioned on one 123a of the two parallel parts, while the other screw M2 is positioned on the other part 123b. By virtue of this arrangement, the magnetic flux flowing from a permanent magnet 121 flows in the same manner with respect to each of the three screws 112 as the manner in which the magnetic flux shown in FIG. 2B flows with respect to the screw M2, thereby enabling a scanning head 110 to be strongly magnetically attracted to the specimen stage 120.

Figure 3B:
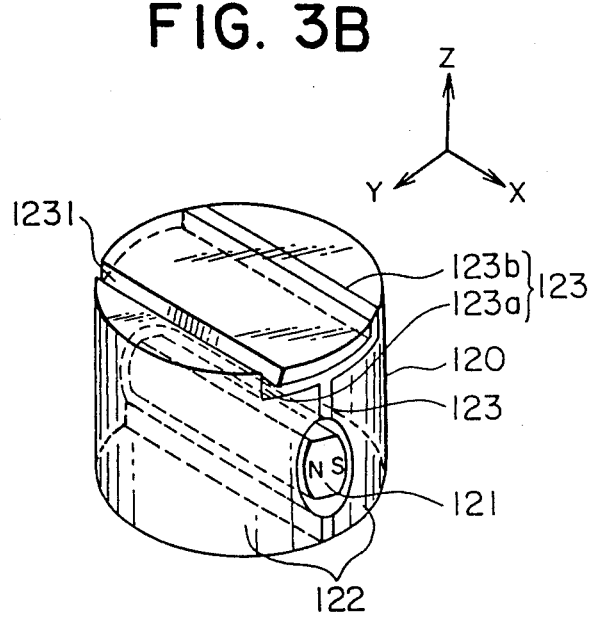
FIGS. 3B through 3D are perspective views showing various modifications of the third embodiment.
Figure 3C:
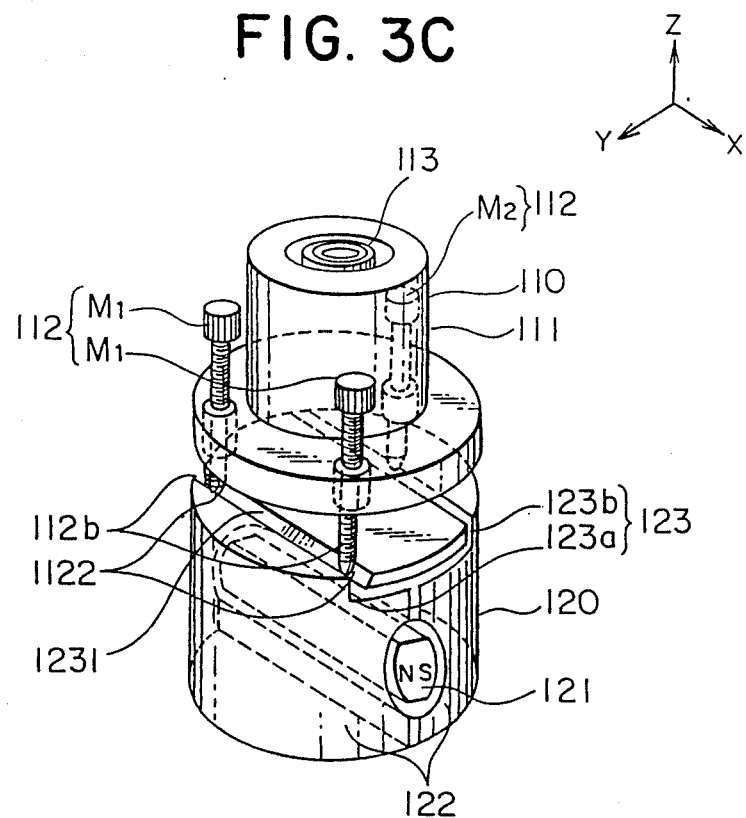

Alternatively, as shown in FIG. 3B, a V-shaped groove 1231 may be formed along the one 123a of the two parallel parts exposed on the specimen placing surface 120a, with either the end portions of the two screws M1 of the associated scanning head 110 or metal spheres 1122 at the ends of these screws M1 being received within the V-shaped groove 1231, as shown in FIG. 3C. By virtue of this arrangement, position determining in the Y direction shown in FIG. 3C is facilitated when the scanning head 110 is being disposed upon the specimen placing surface 120a.

Figure 3D:
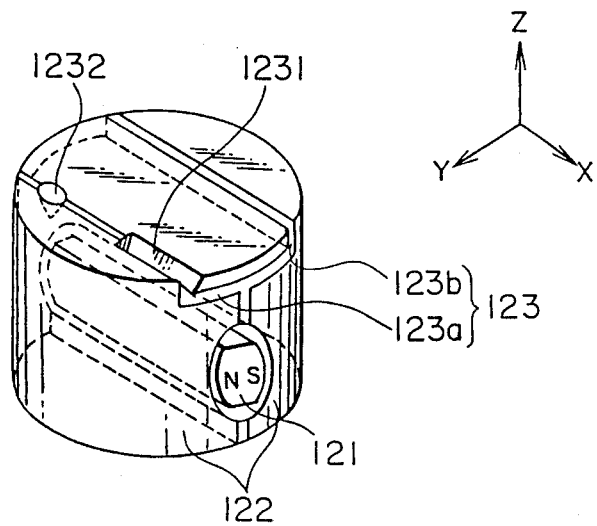

Still alternatively, as shown in FIG. 3D, a v-shaped groove 1231 may be formed along the one 123a of the two parallel parts of the joint member 123 in such a manner as to extend to a mid portion thereof and, simultaneously, one conical groove 1232 may be formed in another portion of that one parallel part 123a, with either the end portions of the two screws M1 or the metal spheres 1122 being respectively received in the V-shaped groove 1231 and the conical groove 1232. By virtue of this arrangement, position determining in the X direction as well as in the Y direction is facilitated when the scanning head 110 is being disposed upon the specimen placing surface 120a.

Figure 3E:
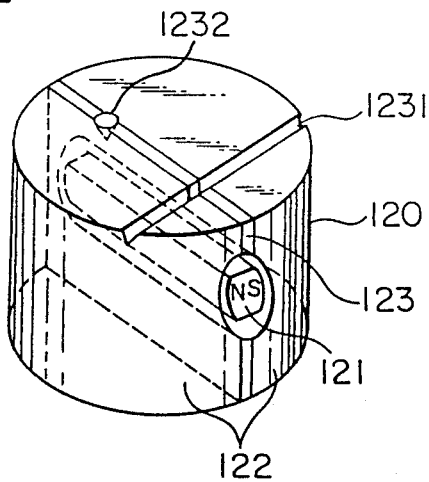
FIGS. 3E through 3G are perspective views showing a fourth embodiment.

FIG. 3E shows a specimen stage 120 of a tunnel unit in accordance with a fourth embodiment of the present invention. According to this embodiment, the specimen stage 120 has two pole pieces 122 of the same type as that shown in FIG. 1A. A specimen placing surface 120a of the specimen stage 120 has one V-shaped groove 1231 formed therein in such a manner as to extend across one of the joint members 123 which is exposed on the specimen placing surface 120a, and one conical groove 1232 formed in that joint member 123. The tunnel unit is used while either the end portions or the associated metal spheres 1122 of two M1 of the screws are received within the V-shaped groove 1231 and the end portion or the associated metal sphere 1122 of the other screw M2 is received within the conical groove 1232. By virtue of this arrangement, position determining in the X and Y directions is facilitated when the associated scanning head 110 is being disposed upon the specimen placing surface 120a. Also, when the screw M2 is being rotated, it can be prevented from rolling and, hence, from being displaced in the X-Y plane.

Figure 3F:
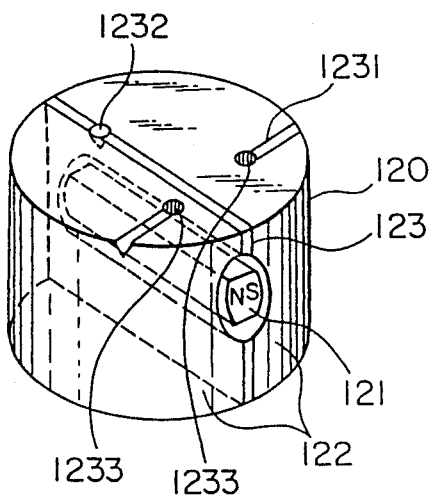
Figure 3G:
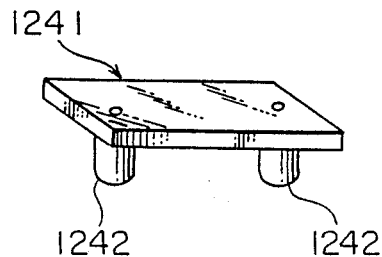

Alternatively, as shown in FIG. 3F, two V-shaped grooves 1231 may be formed on either side of the joint member 123 in such a manner that neither of the V-shaped grooves intersects the joint member 123 and, accordingly, no groove is formed in the center of the specimen placing surface 120a. By virtue of this arrangement, it is possible to facilitate the placing of specimens 124 of small sizes on the specimen placing surface 120a. FIG. 3G shows a specimen holder 1241 for holding a specimen 1241. The specimen holder 1241 is formed of a material having a high magnetic permeability and has a pair of legs 1242. In compliance with these legs 1242, the V-shaped grooves 1231 formed in the specimen stage 120 shown in FIG. 3F have holes 1233 formed at the ends thereof that are closer to the joint member 123. With this arrangement, when the associated permanent magnet 121 is rotated to close the magnetic circuit after the achievement of a condition in which the pair of legs 1242 of the specimen holder 1241 are received in the holes 1233 at the ends of the V-shaped grooves 1231 of the specimen stage 120, and part of a specimen 124 is held beneath the specimen holder 1241, the specimen holder 1241 is attracted to the specimen stage 120 by the magnetic force, thereby allowing the specimen 124 to be secured in place.

Figure 4A:
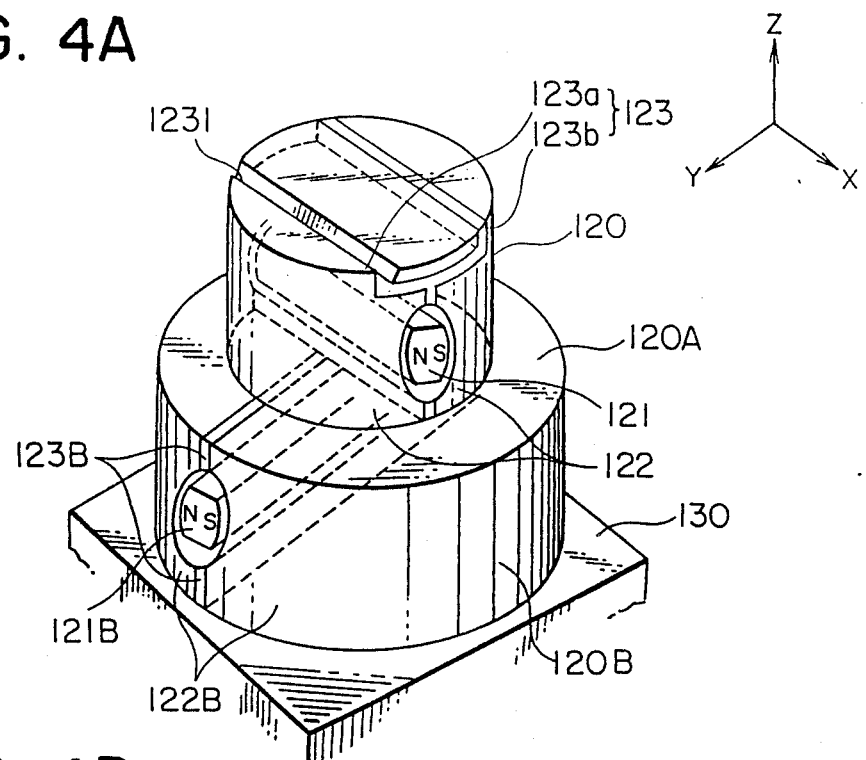
FIG. 4A is a perspective view showing a fifth embodiment.

A fifth embodiment of the present invention is shown in FIG. 4A. In this embodiment, an auxiliary stage 120B is provided between a specimen stage 120, such as that shown in FIG. 3B, and a unit base 130. The auxiliary stage 120B is similar to the specimen stage 120 shown in FIG. 1A in that the auxiliary stage 120B has a pair of second pole pieces 122B joined to each other via second joint members 123B, and a second permanent magnet 121B rotatably inserted at the joint of these second pole pieces 122B. Also, the auxiliary stage 120B has a configuration forming a circular cylinder. The upper end face of the circular cylinder defines a specimen stage disposing surface 120A. The auxiliary stage 120B is disposed upon the unit base 130, and a specimen stage 120 is disposed upon the specimen stage disposing surface 120A of the auxiliary stage 120B. The specimen stage 120 is disposed in such a manner that the associated permanent magnet 121 is normal to the permanent magnet 121B of the auxiliary stage 120B. Although not shown in FIG. 4A, a scanning head 110 is disposed upon the specimen stage 120.

By virtue of the above-described arrangement, the following magnetic attraction, described below under Items [A] to [C], can be achieved.

[A] When the magnetic circuit is simultaneously open in each of the specimen stage 120 and the auxiliary stage 120B, none of the scanning head 110, the specimen stage 120, the auxiliary stage 120B, and the unit base 130 magnetically attract one another.

[B] When the magnetic circuit is closed in the auxiliary stage 120B alone, the specimen stage 120, the auxiliary stage 120B, and the unit base 130 magnetically attract one another, but the scanning head 110 is kept from being magnetically attracted to the specimen stage 120.

[C] When the magnetic circuit is simultaneously closed in each of the specimen stage 120 and the auxiliary stage 120B, all the scanning head 110, the specimen stage 120, the auxiliary stage 120B, and the unit base 130 magnetically attract one another.

Therefore, when the operations under [A] and [B] are successively performed in this order, the specimen stage 120 is rigidly fixed in place above the unit base 130, together with the auxiliary stage 120B . Thereafter, when the operation under [C] is performed, the scanning head 110 can be fixed to the specimen stage 120. In this way, it is possible to disassemble and reassemble the scanning head 110 alone, thereby facilitating operations such as the replacement of the probe 115 or the specimen 124.

Figure 4B:
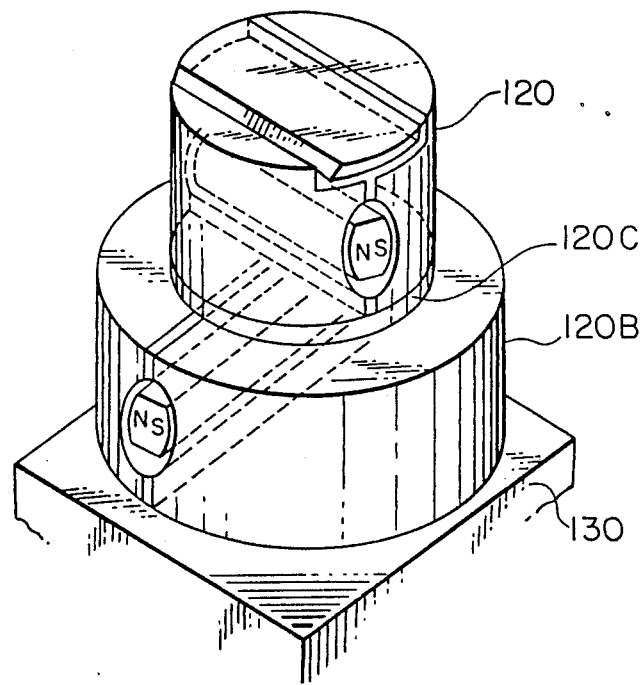
FIGS. 4B through 4D are perspective views showing various modifications of the fifth embodiment.

Alternatively, as shown in FIG. 4B, an electrically insulating portion 120C formed of a material possessing electrically insulating and adhesive characteristics, such as an epoxy resin having a high volume resistivity, may be provided between the auxiliary stage 120B and the specimen stage 120. In this case, since the specimen stage 120 on which specimens 124 may be placed and the unit base 130 are electrically insulated, it is possible to form a voltage circuit in which the bias voltage to be applied between the probe 115 and the specimen 124 can be easily set to either of positive and negative voltages.

Figure 4C:
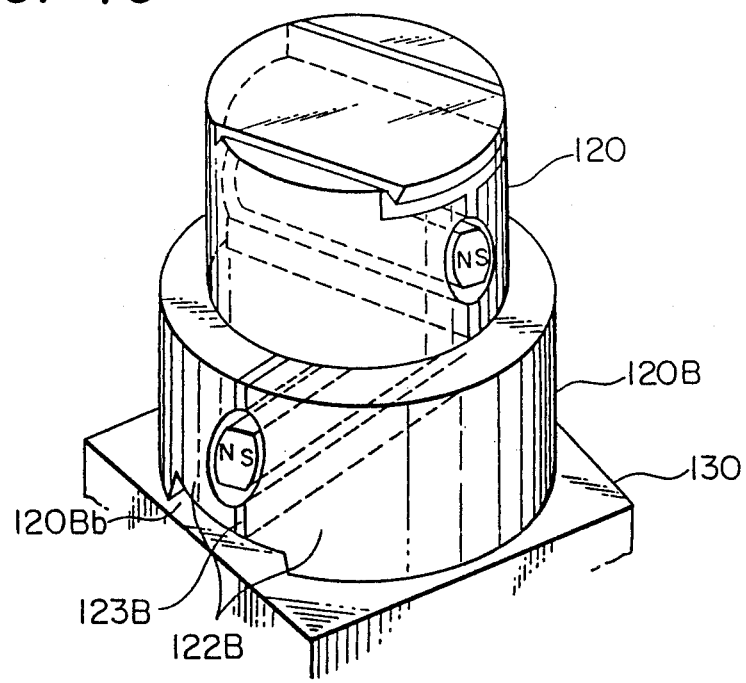
Figure 4D:
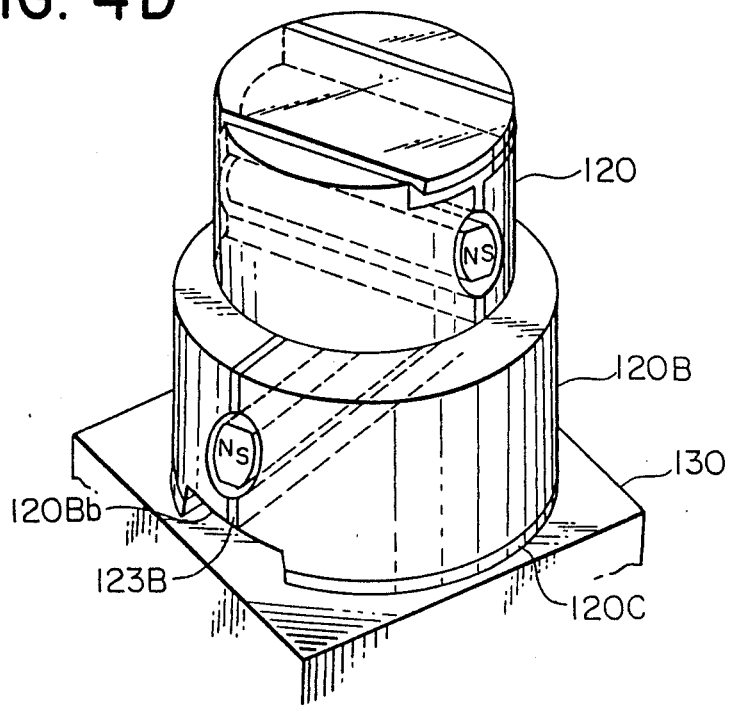

Still alternatively, as shown in FIG. 4C, a notch 120Bb may be formed in the lower end face of the auxiliary stage 120B and along the joint of the two pole pieces 122B. By virtue of this arrangement, since portions of the two pole pieces 122B at which they are in contact with the unit base 130 can be separated from each other, the auxiliary stage 120B can be magnetically attracted to the unit base 130 with improved mechanical stability and rigidity. Further, as shown in FIG. 4D, an electrically insulating portion 120C having a magnetic permeability and electrically insulating characteristics, such as a mixture of an epoxy resin which is an electrical insulator, and fine particles of a substance having a high magnetic permeability dispersed therein, may be provided at the portions of the two pole pieces 122B where they are in contact with the unit base 130.

Figure 5A:
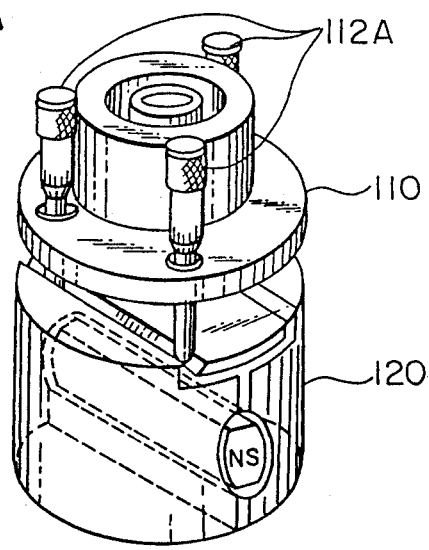
FIG. 5A is a perspective view showing a sixth embodiment.
Figure 5B:
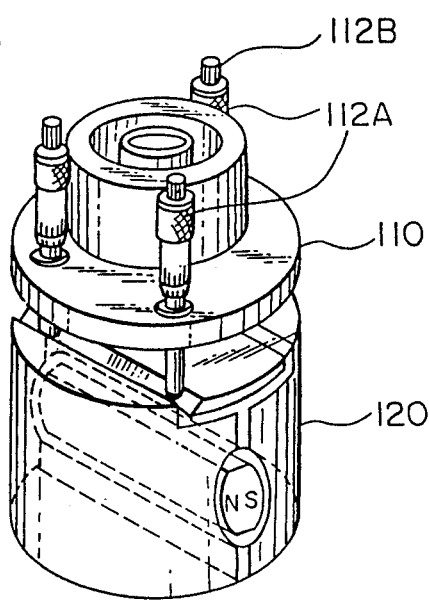
FIG. 5B is a perspective view showing a modification of the sixth embodiment.

A sixth embodiment of the present invention is shown in FIG. 5A. A scanning head 110 has three screws 112 which each comprise a micrometer 112A. According to this embodiment, it is possible to vertically move the scanning head 110 while the scales of these micrometers 112A are being read. Thus, it is possible to estimate the distance between the associated probe 115 and the specimen 124 which are being brought close to each other, and to reduce the risk that the probe 115 may collide with the specimen 124. Further, if micrometers 112A provided with click-generating knobs 112B are used, as shown in FIG. 5B, since clicks can be sensed by the operator each time the screw 112 is manually rotated through a constant small rotational angle, the operator can directly know the fact that the probe 115 is being brought close to the specimen 124, and, in addition, the distance between the probe 115 and the specimen 124 being brought close to each other can be estimated easily by counting the number of clicks generated. Such a click-generating knob 112B may be achieved by providing a plurality of small steel balls around the axis of each micrometer 112A, and also providing rectangular springs in the gaps between the steel balls, thereby providing one type of a miniature ball bearing.

Figure 5C:
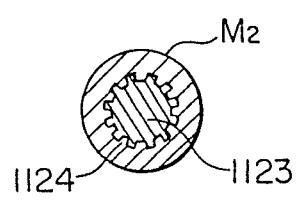
FIGS. 5C through 5K are perspective views used to explain various other modifications of the sixth embodiment.
Figure 5D:
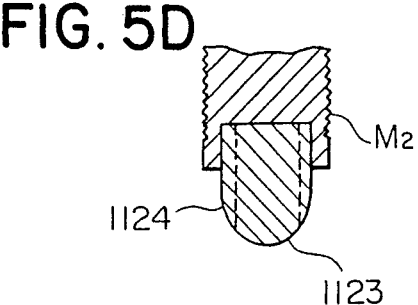
Figure 5E:
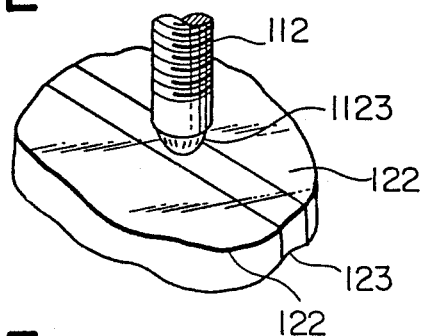
Figure 5F:
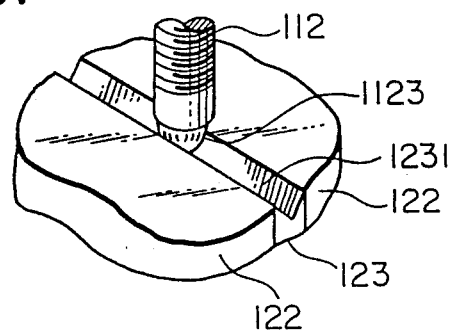
Figure 5G:
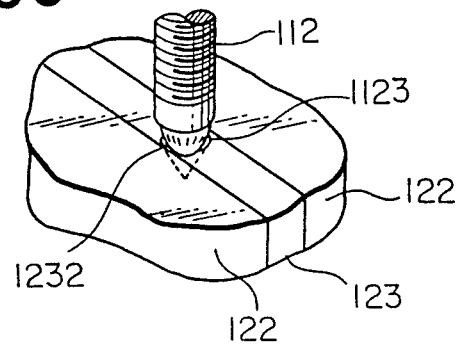
Figure 5H:
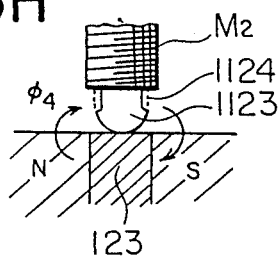
Figure 5I:
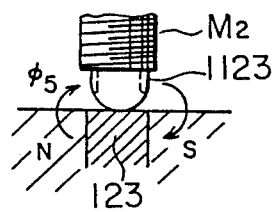
Figure 5J:
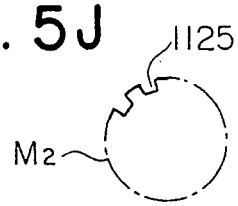
Figure 5K:
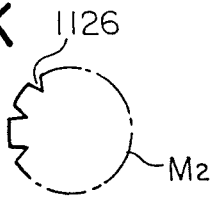

Alternatively, as shown in FIGS. 5C and 5D, a metal hemisphere 1123 may be mounted at the end 112b of the screw M2 positioned on the joint member 123 that is exposed on the specimen placing surface 120a of the specimen stage 120, the outer side of the metal hemisphere 1123 having grooves 1124, such as those recess-shaped or V-shaped, formed therein at equal intervals and extending parallel with the axis of the screw M2. The screw M2 having this arrangement may be rotated, as shown in FIGS. 5E to 5G, on a flat joint member 123, in a v-shaped groove 1231 formed in a joint member 123, or in a conical groove 1232 formed in a joint member 123. In this case, as shown in FIGS. 5H and 5I, in accordance with the position of the grooves 1124 formed in the metal hemisphere 1123, the magnetic flux flowing through the associated two pole pieces 122 and the metal hemisphere 1123 changes from magnetic flux $\phi 4$ to magnetic flux $\phi 5$. As a result, when the screw M2 is being manually rotated, clicks are sensed by the operator. This allows the operator to directly know the fact that the probe 115 is being brought close to the specimen 124, and to easily estimate the distance between the probe 115 and the specimen 124 being brought close to each other by counting the number of clicks generated. In the case where no metal sphere 1122 nor metal hemisphere 1123 are provided, and the end portion of the screw M2 is directly brought into contact with the joint member 123, recess-shaped grooves 1125, V-shaped grooves 1126, or the like may be formed in the outer periphery at the end portion of the screw M2, as shown in FIGS. 5J and 5K in order that clicks may be sensed by the operator while the screw M2 is manually rotated.

Figure 6A:
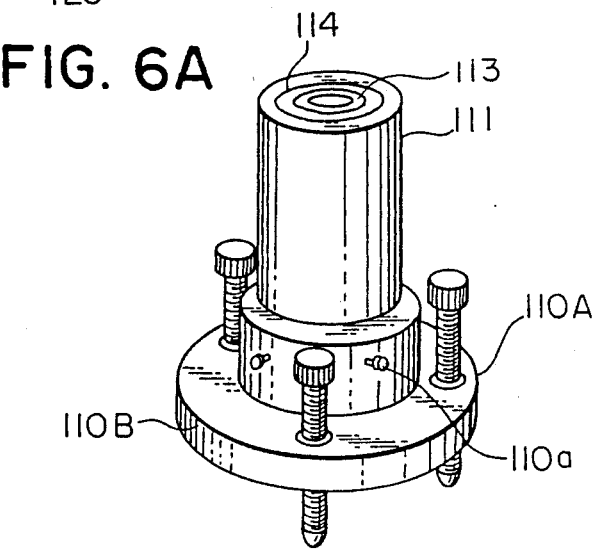
FIGS. 6A and 6B are perspective views showing a seventh embodiment.
Figure 6B:
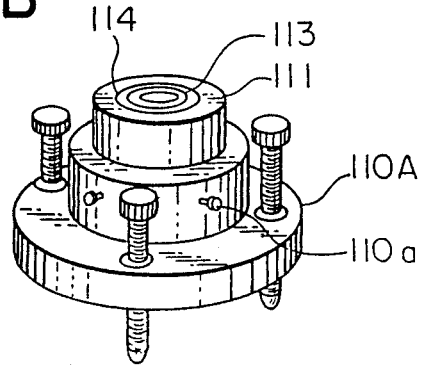

A seventh embodiment of the present invention is shown in FIGS. 6A and 6B. In this embodiment, a scanning head 110 comprises a scanning head main body 111 and a head adapter 110A, and three screws 112 are mounted on a flange 110B of the head adapter 110A. The scanning head main body 111 is inserted into a through hole formed in the center of the head adapter 110A and is fixed in place by stopper screws 110a. According to this embodiment, the scanning head main body 111 and the head adapter 110A can be easily assembled and disassembled, and the replacement of the scanning head main body 111 enables the use of circular cylindrical piezoelectric elements 113 of different lengths L. Specifically, since the displacement sensitivity of a circular cylinder piezoelectric element 113 is expressed as $d \times L/W$, as described before, if scanning head main bodies 111 provided with piezoelectric elements 113 of different lengths L are used by suitably replacing them with one another, the range and scope for the observation of specimens 124 can be selected.

Figure 6C:
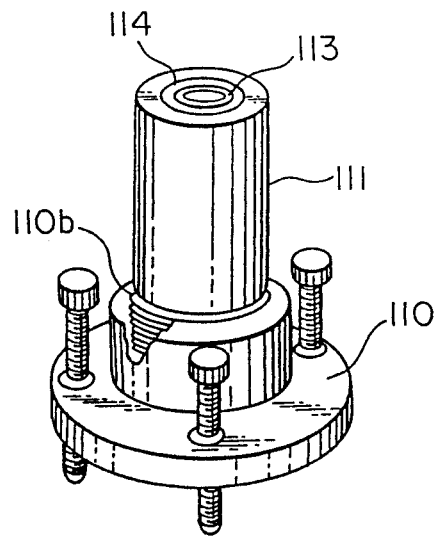
FIGS. 6C and 6D are perspective views showing various modifications of the seventh embodiment.
Figure 6D:
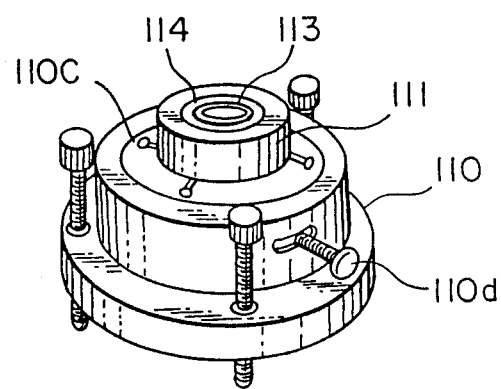

Alternatively, as shown in FIG. 6C, if the scanning head main body 111 is assembled onto the head adapter 110A by means of a screw socket 110b, it is possible to achieve rigid fixing. Still alternatively, a collet chuck 110c may be provided between the head adapter 110A and the scanning head main body 111 so that the scanning head main body 111 is fixed in place by the collet chuck 110c. In this case, the assembly and disassembly of the scanning head main body 111, which is effected by opening and closing a collet chuck lever 110d, is much facilitated, and, in addition, rigid fixing can be achieved.

Figure 7A:
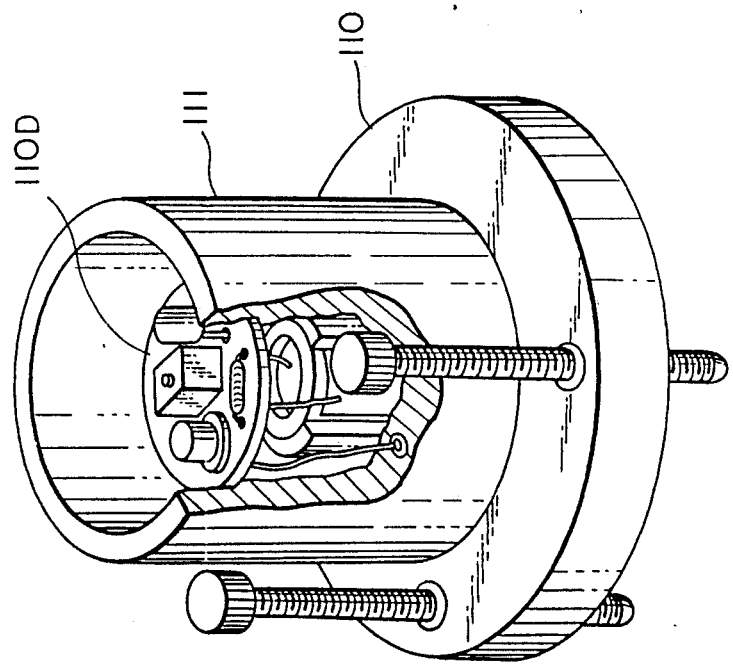
FIG. 7A is a partially cutaway perspective view of a scanning head used in an eighth embodiment.
Figure 7B:
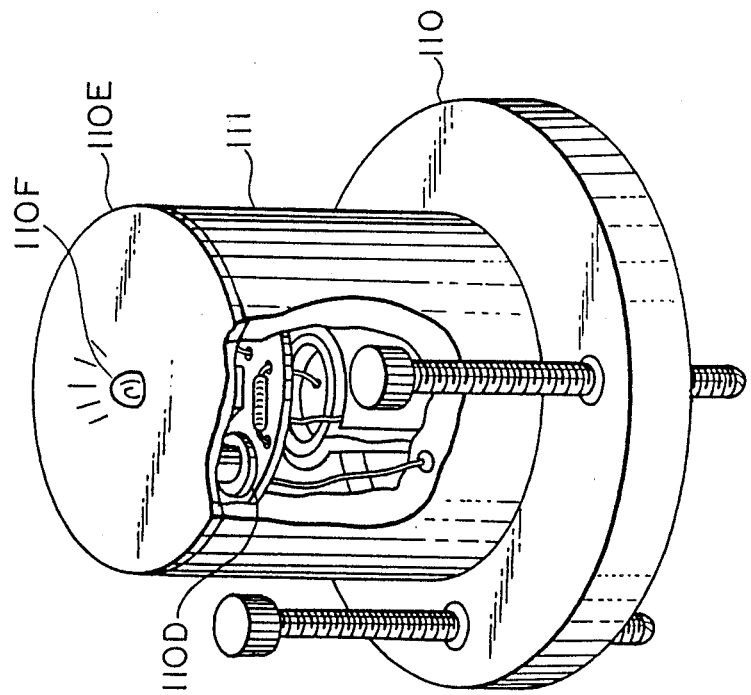
FIG. 7B is a partially cutaway perspective view showing a modification of the eighth embodiment.
Figure 7C:
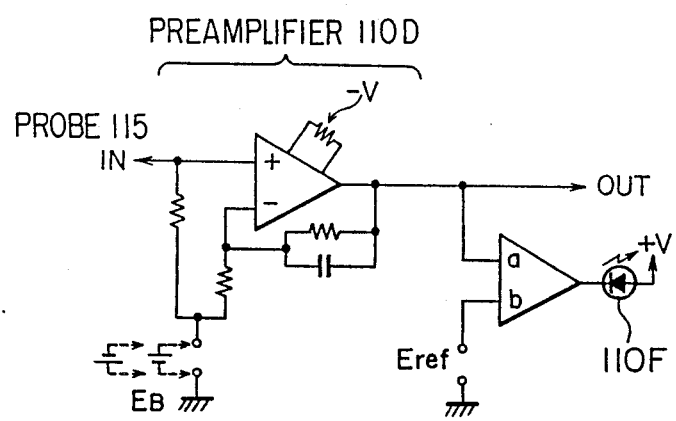
FIGS. 7C and 7D are circuit diagrams showing electric circuits which may be used in the modification shown in FIG. 7B.
Figure 7D:
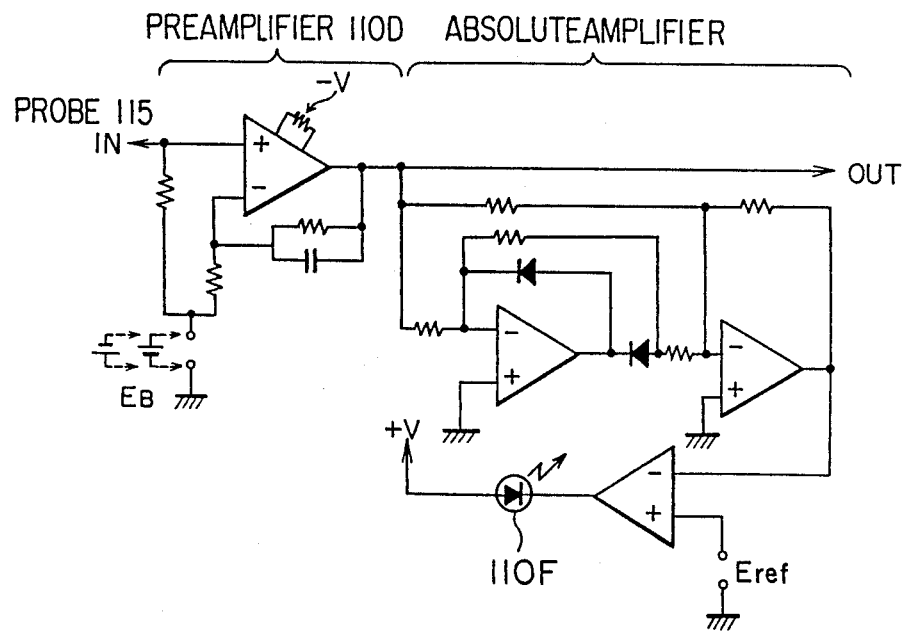

FIG. 7A shows an eighth embodiment of the present invention. In this embodiment, a scanning head main body 111 of a scanning head 110 incorporates a preamplifier 110D provided for amplifying the tunnel current from the associated probe 115. By virtue of this arrangement, according to this embodiment, it is possible to obtain an electric signal which is proportional to the tunnel current and is not affected by any external noise. Alternatively, as shown in FIG. 7B, the tunnel unit may further include an electric shielding cover 110E provided at the upper portion of the scanning head main body 111, and a display lamp 110F, such as an LED lamp, provided on the shielding cover 110E and capable of turning off when the tunnel current flowing through the probe 115 has reached a set value. Since the display lamp 110F is turns off upon the achievement of a set value of the tunnel current, there is no risk of any electric noise being generated by the display lamp 110F during the operation of the tunnel unit. In addition, since the display lamp 110F is turned on and off independently from whether the bias voltage applied between the probe 115 and the specimen 124 is positive or negative, an absolute amplifier to which the output of a preamplifier 110D is supplied as an input signal may be incorporated within the scanning head main body 111, together with the preamplifier 110D. An example of an electric circuit comprising a preamplifier 110D and a display lamp 110F is shown in FIG. 7C, while an example of an electric circuit comprising a preamplifier 110D, an absolute amplifier, and a display lamp 110F is shown in FIG. 7D.

Figure 8A:
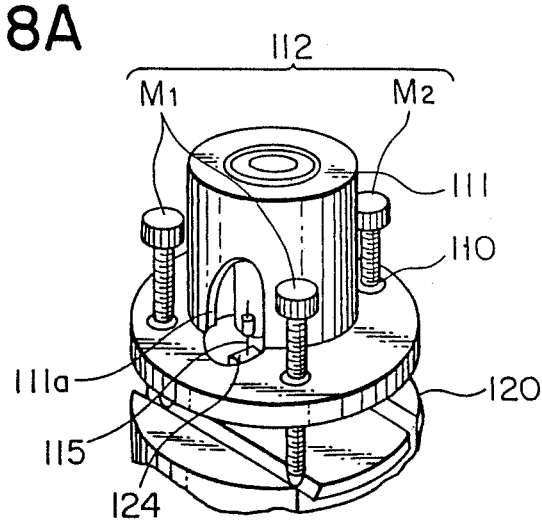
FIG. 8A is a perspective view showing a ninth embodiment.
Figure 8B:
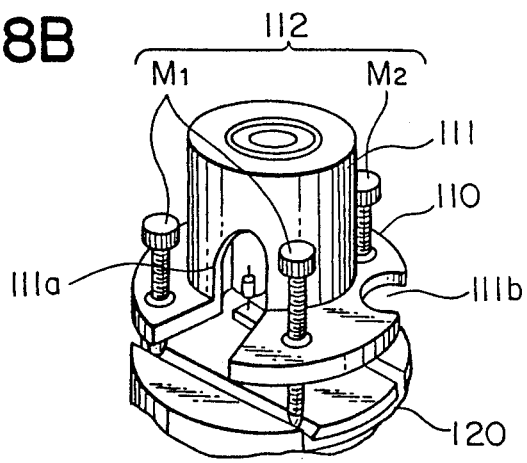
FIGS. 8B and 8C are perspective views showing various modifications of the ninth embodiment.

A ninth embodiment of the present invention is shown in FIG. 8A. In this embodiment, an opening 111a is formed at a portion of a scanning head main body 111, thereby enabling the probe 115 and the specimen 124 to be visually observed through the opening 111a. By virtue of this arrangement, it is possible to directly observe the probe 115 and the specimen 124 brought close to each other by rotating screws 112. Alternatively, as shown in FIG. 8B, an opening 111a may be formed in the scanning head main body 111 in such a manner as to completely separate two Ml of the screws 112. With this arrangement, the tip of the probe 115 can be observed more easily. If notches 111b of a suitable depth and a suitable width are simultaneously formed between the other screw M2 and each of the two screws Ml in order to adjust the distribution of the weight of the scanning head 110, the weight of the scanning head 110 applied to the three screws 112 can be distributed with good balance.

Figure 8C:
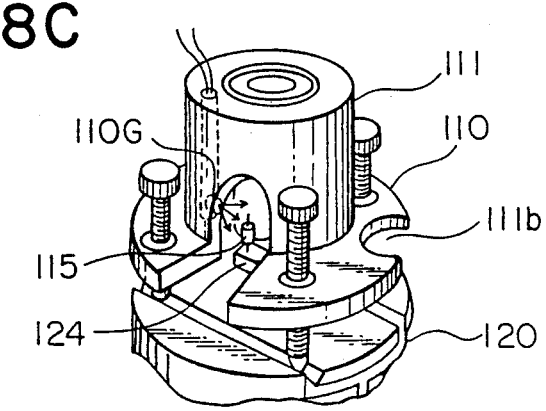

Further, as shown in FIG. 8C, an illuminating lamp 110G may be provided in the vicinity of an opening 111 provided for observing the probe 115. The provision of the lamp 110G facilitates the observation of the probe 115. In addition, if an illuminating lamp 110G capable of generating light within a specific range of wavelength is used, the following advantage is provided. When the light from such a lamp 110G is radiated onto the surface of a specimen 124 which is formed of a semiconductor having a low carrier density, an optically excited carrier is produced, thereby facilitating the operation of the associated STM.

Figure 9A:
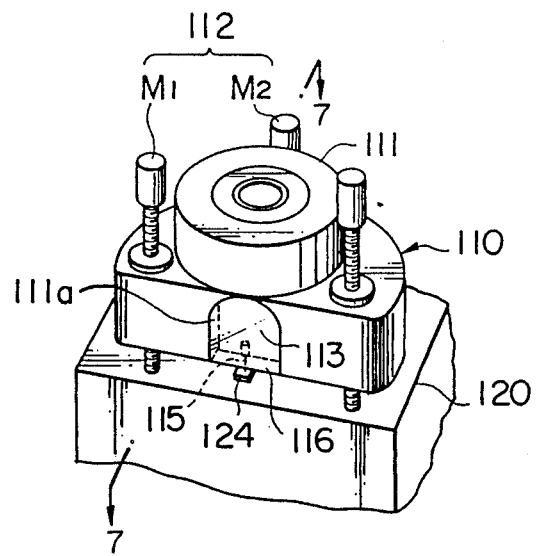
FIG. 9A is a perspective view showing a tenth embodiment.
Figure 9B:
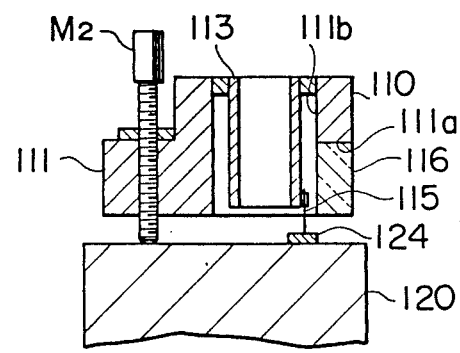
FIG. 9B is a sectional view taken along the line VII—VII shown in FIG. 9A.

A tenth embodiment of the present invention is shown in FIGS. 9A and 9B. In this embodiment, an observation window body 116 is provided in an opening 111a of a scanning head main body 111 of a scanning head 110 in such a manner as to close the opening 111a. The opening 111a is located on one side of the scanning head main body 111 and in front of a probe 115. The configuration of the opening 111a is, for instance, horseshoe-shaped and defined by a semicircular arc having a radius of 6 mm and two straight lines continuing from the semicircular arc and having a length of 2 mm, and has, for instance, a depth of 7 mm. If, as in the case of the second embodiment, a piezoelectric element 113 having an outer diameter of 12 mm is used, and simultaneously if a through hole 111b of the scanning head main body 111 in which the piezoelectric element 113 is inserted has a diameter of 18 mm, the distance from the outermost end of the opening 111a to the tip of the probe 115 is approximately 10 mm.

The observation window body 116 is formed of a material which is optically transparent and has a sound insulating property, such as boro-silicate crown glass, molten quartz glass, or synthetic quartz glass. If the scanning head 110 is to be used in a certain type of environment where the scanning head 110 will be subjected to relatively little external noise, a plastic material such as acrylic diglycol carbonate may be used. The observation window body 116 is formed with the same configuration as the opening 111a, and is fixed within the opening 111a by employing either a tight-fitting method or an adhesive. If the opening 111a has a configuration of certain type, threads may be formed in the outer periphery of the observation window body 116 and the inner periphery of the opening 111a in such a manner as to allow mutual engagement of these threads.

By virtue of the provision of the observation window body 116 in the opening 111a, it is possible to prevent any sound waves from propagating from the outside into the scanning head main body 111 through the opening 111a and, hence, to prevent them from disturbing the probe 115 and the ambient atmosphere. Thus, according to this embodiment, the scanning head 110 is capable of reducing the possibility of electric noise being generated. Further, since the scanning head 110 does not have to be covered with a sound wave insulating case, the efficiency of an observation operation is enhanced.

Figure 10A:
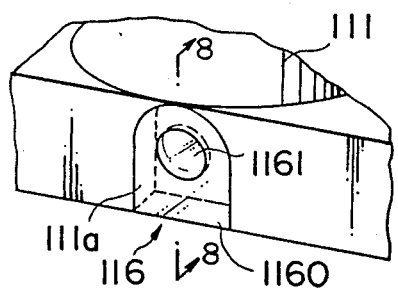
FIG. 10A is a perspective view showing essential parts of an eleventh embodiment.
Figure 10B:
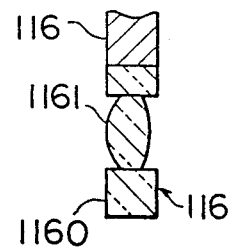
FIG. 10B is a sectional view taken along the line VIII-VIII shown in FIG. 10A.

An eleventh embodiment of the present invention is shown in FIGS. 10A and 10B. In this embodiment, an observation window body 116 comprises a window main body 1160 and a magnifying lens 1161 provided in the center of the window main body 1160. An example which may be used as the magnifying lens 1161 is a single spherical lens having a focal length which is substantially equal to the distance between the principal plane of the magnifying lens 1161 and the tip of the probe 115, and also having a maximum possible outer diameter that can be received within the opening 111a.

The magnifying lens 1161 may be disposed with its optical axis extending perpendicular to the Z-direction of the piezoelectric element 113. Alternatively, the magnifying lens 1161 may be disposed obliquely so as to facilitate the observation of the tip of the probe 115 and the specimen 124. If threads are formed in the outer periphery of the magnifying lens 1161 and the inner periphery of a through hole formed in the window main body 1160 to fit the magnifying lens 1161 therein, and in such a manner as to allow mutual engagement of these threads, the depth with which the magnifying lens 1161 is mounted on the window main body 1160 can be easily varied, thereby enabling the adjustment of the focal point of the magnifying lens 1161. In this embodiment, by virtue of the arrangement in which the observation window body 116 has the magnifying lens 1161, the observation of the tip of the probe 115 and the specimen 124 is facilitated, and, furthermore, there is no need to prepare a separate magnifier in addition to the scanning head 110. An alternative arrangement may be adopted in which no window main body 1160 is used and a magnifying lens 1161 alone is mounted on the scanning head main body 111 to serve as an observation window body 116.

Figure 10C:
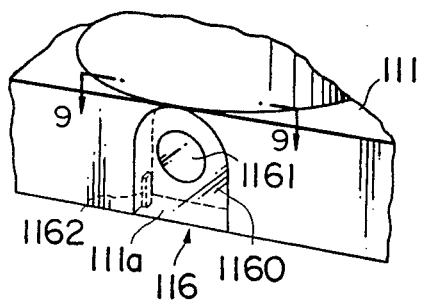
FIGS. 10C through 10H are views showing various modifications of the eleventh embodiment, FIGS. 10D, 10F and 10H being sectional views respectively taken along the line IX—IX shown in FIG. 10C, the line X—X shown in FIG. 10E, and the line XI—XI shown in FIG. 10G.
Figure 10D:
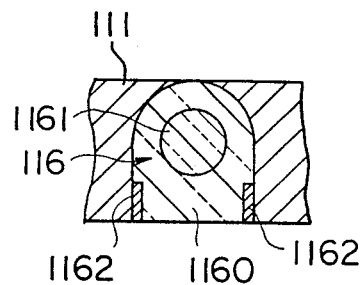

If the material used to form the scanning head main body 111 is a magnetic substance such as Invar or super-Invar, permanent magnets 1162 may be impregnated in outer peripheral portions of the window main body 1160, as shown in FIGS. 10C and 10D. With this arrangement, the observation window body 116 is fixed within the opening 111a by utilizing the magnetic force of the permanent magnets 1162. Magnets having a large coercive force, e.g., magnets of rare earth elements should preferably be used as the permanent magnets 1162. With this arrangement, the assembly and disassembly of the observation window body 116 onto and from the scanning head main body 111 can be greatly facilitated. Furthermore, the position of the focal point of the magnifying lens 1161 can be easily varied by varying the depth with which the observation window body 116 is positioned within the opening 111a. This is advantageous in that, even when the position of the probe 115 or the specimen 124 has become slightly deviated during replacement, if the depth with which the observation window body 116 is positioned within the opening 111a is suitably adjusted, the tip of the probe 115 and the specimen 124 can be observed clearly.

Figure 10E:
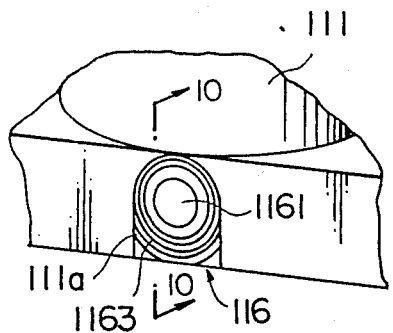
Figure 10F:
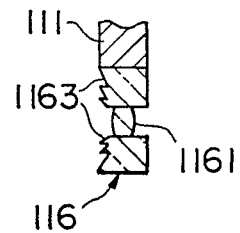

Still alternatively, a condenser lens 1163 may be formed in a portion of the window main body 1160 which is in the periphery of the magnifying lens 1161, as shown in FIGS. 10E and 10F. The condenser lens 1163 may be, for instance, a Fresnel lens, and in this case, the magnifying lens 1161 is provided in the center of the Fresnel lens. With this arrangement, light from the outside of the scanning head 110 is converged by the condenser lens 1163 to be brightly shone on the tip of the probe 115 and the specimen 124, thereby facilitating observation.

Figure 10G:
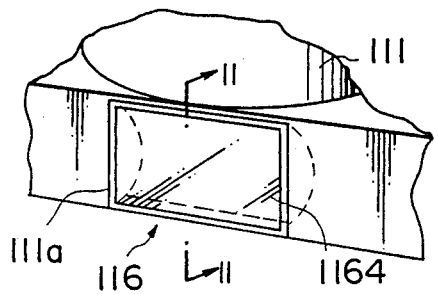
Figure 10H:
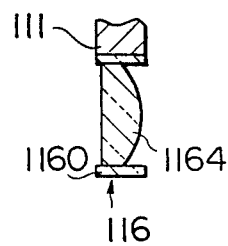

Alternatively, as shown in FIGS. 10G and 10H, a cylindrical lens 1164 may be mounted within the opening 111a, instead of the single spherical lens 1161. With this arrangement, the field of view provided is wider than that provided by the single spherical lens 1161, thereby further facilitating the observation of the tip of the probe 115, etc.

Figure 11A:
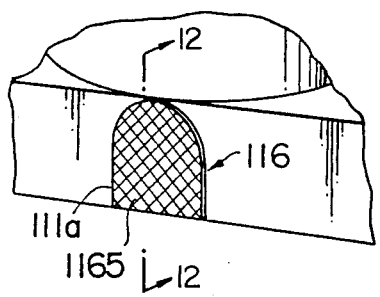
FIG. 11A is a perspective view showing essential parts of a twelfth embodiment.
Figure 11B:
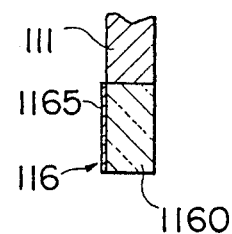
FIG. 11B is a sectional view taken along the line XII—XII shown in FIG. 11A.

A twelfth embodiment of the present invention is shown in FIGS. 11A and 11B. In this embodiment, an observation window body 116 has a window main body 1160 and an electromagnetic wave insulating shield 1165 formed on one surface of the window main body 1160. An example which may be used as the electromagnetic wave insulating shield 1165 is an electroconductive film such as the so-called ITO film formed of an oxide of indium and tin. Such a film is formed as the shield 1165 by coating it on the surface of the window main body 1160. The electromagnetic wave insulating shield 1165 is electrically connected, at its outer peripheral portion, to the scanning head main body 111 formed of a metal material, so as to shut out electromagnetic waves propagating inwardly from the outside. An example of a method of electrically connecting the electromagnetic wave insulating shield 1165 and the scanning head 111 is a method in which an electroconductive adhesive is applied to the interface between these members. Alternatively, electrical connection between the electromagnetic wave insulating shield 1165 and the scanning head main body 111 may be provided by using a metal frame which is in contact with the shield 1165, is mechanically fixed to the side portions of the observation window body 116, and is kept in contact with the inner periphery of the opening 111a. With the arrangement of this embodiment, since it is possible to shut out not only sound waves but also electromagnetic waves, the scanning head 110 is capable of achieving a further reduction in the possibility of electric noise generation.

Figure 11C:
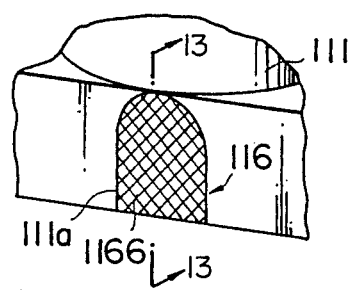
FIGS. 11C through 11F are views showing various modifications of the twelfth embodiment, FIGS. 11D and 11F being sectional views respectively taken along the line XIII—XIII shown in FIG. 11C, and the line XIV—XIV shown in FIG. 11E.
Figure 11D:
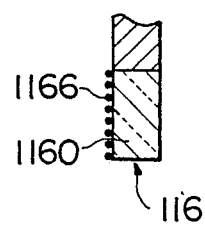
Figure 11E:
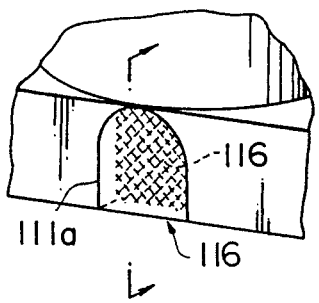
Figure 11F:
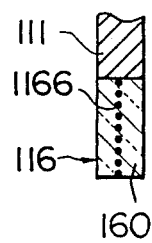

Alternatively, as shown in FIGS. 11C and 11D, instead of using the electromagnetic wave insulating shield 1165 coated on the surface of the window main body 1160, an electromagnetic wave insulating shield 1166 which is formed of meshes of an electroconductive material may be bonded to the surface of the window main body 1160. Still alternatively, an arrangement such as that shown in FIGS. 11E and 11F may be adopted in which the window main body 1160 is formed of a plastic material such as a polycarbonate or acrylic material, and the electromagnetic wave insulating shield 1166 is impregnated within this window main body 1160.

Figure 12A:
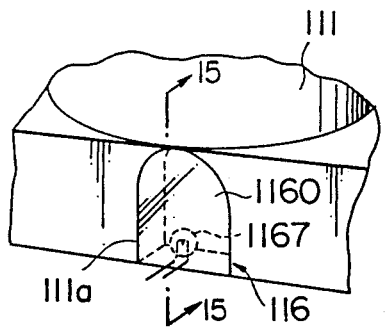
FIG. 12A is a perspective view showing essential parts of a thirteenth embodiment.
Figure 12B:
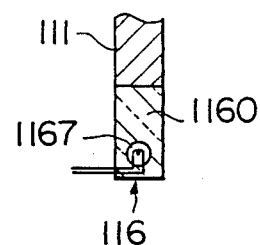
FIG. 12B is a sectional view taken along the line XV—XV shown in FIG. 12A.
Figure 12C:
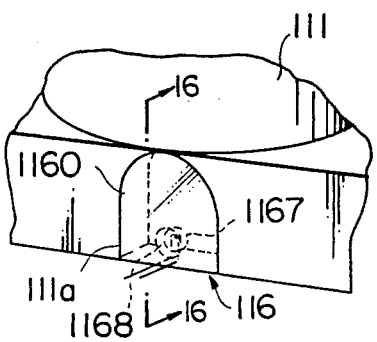
FIG. 12C is a perspective view showing a modification of the thirteenth embodiment.
Figure 12D:
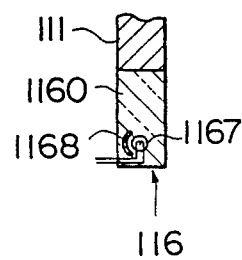
FIG. 12D is a sectional view taken along the line XVI—XVI shown in FIG. 12C.

A thirteenth embodiment of the present invention is shown in FIGS. 12A and 12B. In this embodiment, an illuminating lamp 1167 is impregnated in a window main body 1160. The illuminating lamp 1167 is disposed at a position with which the observation of the probe 115 and the specimen 124 is not hindered. Since light radiated from the illuminating lamp 1167 provides brightness, this facilitates the observation of the probe 115 and the specimen 124. Although the illuminating lamp 1167 shown in FIG. 12B is impregnated within the window main body 1160, the lamp 1167 may alternatively be mounted on the surface of the window main body 1160, or be provided in such a manner that only a portion of the lamp 1167 is impregnated within the window main body 1160, with the remaining portion being exposed on the out side of the window main body 1160. Still alternatively, as shown in FIGS. 12C and 12D, a mirror 1168 may provided in the vicinity of the illuminating lamp 1167. With this arrangement, light from the illuminating lamp 1167 is reflected by the mirror 1168 to be shone on the probe 115 and the specimen 124, thereby achieving an increased brightness in the portion to be observed. A preferable example of the mirror 1168 is a mirror having a light-converging characteristic, such as a concave mirror.

Figure 13:
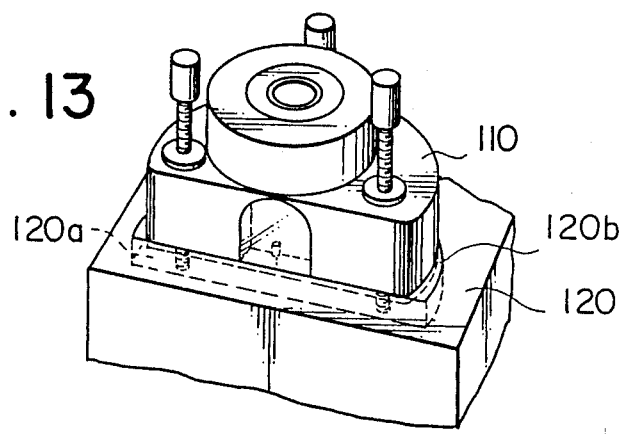
FIG. 13 is a perspective view showing a fourteenth embodiment.
Figure 14A:
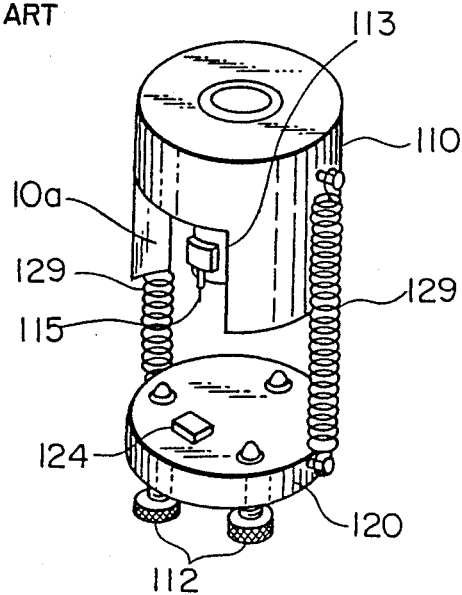
FIGS. 14A and 14B are perspective views of conventional tunnel units.
Figure 14B:
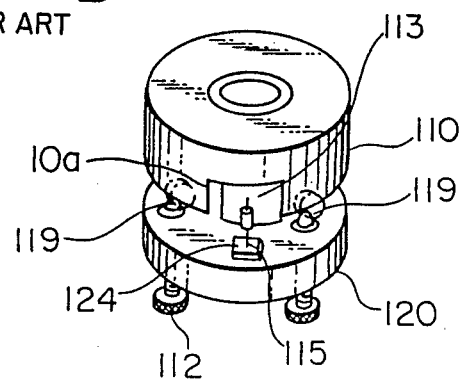

A fourteenth embodiment of the present invention is shown in FIG. 13. In this embodiment, a specimen stage 120 has a recess 120b formed in the specimen placing surface 120a thereof, and a scanning head 110 is disposed in this recess 120b. The bottom face of the scanning head main body 111 is received within the recess 120b. With this arrangement, it is possible to prevent a risk that sound waves or electromagnetic waves propagating inwardly from the outside may directly propagate to the associated probe 115 passing through the gap between the bottom face of the scanning head main body 111 and the specimen placing surface 120a of the specimen stage 120. Thus, it is possible to further enhance the effect of insulating sound waves and electromagnetic waves.

What is claimed is:

1. A tunnel unit for a scanning tunneling microscope comprising:
  a specimen stage having a plurality of pole pieces joined together via a joint member formed of a non-magnetic material, and a specimen placing surface where said plurality of pole pieces and said joint member are exposed;
  a permanent magnet rotatably inserted within said specimen stage where said plurality of pole pieces are joined;
  a scanning head disposed above said specimen placing surface of said specimen stage extending across said exposed joint member;
  a piezoelectric element fixed to said scanning head;
  a probe mounted on said piezoelectric element; and
  screw means formed of a magnetic material and rotatably engaging said scanning head, said screw means contacting said specimen placing surface of said specimen stage to support said scanning head above said specimen placing surface of said specimen stage.

2. A tunnel unit according to claim 1 wherein said screw means comprises first, second and third screws disposed at the vertexes of an isosceles triangle having a base, said second and third screws being positioned on opposite ends of the base of said isosceles triangle, said first screw being positioned on the perpendicular bisector of said base.

3. A tunnel unit according to claim 2 wherein said probe is disposed at a position on the perpendicular bisector of the base of said isosceles triangle separated from said base.

4. A tunnel unit according to claim 2 wherein said isosceles triangle is an equilateral triangle.

5. A tunnel unit according to claim 2 further comprising an internally threaded collar formed of a nonmagnetic magnetic material in said scanning head, said first screw threadedly engaging said internally threaded collar.

6. A tunnel unit according to claim 2 further comprising a metal sphere formed of a magnetic material and provided at one end of said first screw, said metal sphere being in point contact with said specimen placing surface of said specimen stage.

7. A tunnel unit according to claim 6 further comprising metal spheres which are formed of a magnetic material and are respectively provided at one end of each of said second and third screws, said metal spheres being in point contact with said specimen placing surface of said specimen stage.

8. A tunnel unit according to claim 2 wherein said plurality of pole pieces comprise first and second pole pieces which each have a configuration obtained by longitudinally bisecting a circular cylinder, said specimen stage having the configuration of a circular cylinder in which said first and second pole pieces are joined via said joint member, said specimen placing surface being defined by an end face of said circular cylinder.

9. A tunnel unit according to claim 8 wherein said first screw is positioned on said joint member exposed on said specimen placing surface, said second and third screws being positioned on either side of said exposed joint member.

10. A tunnel unit according to claim 9 further comprising a V-shaped groove formed in said specimen placing surface and extending across said joint member exposed on said specimen placing surface, and one conical groove formed in said exposed joint member, said first screw being positioned within said conical groove, both of said second and third screws being positioned within said V-shaped groove.

11. A tunnel unit according to claim 9 further comprising two V-shaped grooves formed in line with each other in said specimen placing surface and on either side of said joint member exposed on said specimen placing surface, and one conical groove formed in said exposed joint member, said first screw being positioned within said conical groove, said second and third screws being positioned within different ones of said two streaks of V-shaped grooves.

12. A tunnel unit according to claim 11 further comprising holes formed at the ends of said two V-shaped grooves and a specimen holder formed of a magnetic material and having legs capable of fitting in said holes and a flat-plate shaped main body for holding the specimen.

13. A tunnel unit according to claim 2 wherein said plurality of pole pieces comprise first and second pole pieces which each have the configuration obtained by longitudinally bisecting a circular cylinder, and which have a pair of opposing steps formed in the upper portions thereof, and a flat-plate shaped third pole piece disposed within a recess defined by said pair of steps, with two parallel parts of said joint member forming two grooves and being exposed on said specimen placing surface.

14. A tunnel unit according to claim 13 wherein said first screw is positioned on one of said two parallel parts of said joint member exposed on said specimen placing surface, both of said second and third screws being positioned on the other exposed part of said joint member.

15. A tunnel unit according to claim 14 further comprising a V-shaped groove formed along the other part of said joint member exposed on said specimen placing surface, end portions of said second and third screws being positioned within that V-shaped groove.

16. A tunnel unit according to claim 14 further comprising a V-shaped groove formed in a portion of the other part of said joint member exposed on said specimen placing surface and extending along the other exposed part of said joint member, and one conical groove formed in another portion of the other exposed part of said joint member, wherein ends of said second and third screws are respectively positioned within the V-shaped groove and the conical groove.

17. A tunnel unit according to claim 1 further comprising an auxiliary stage having a plurality of auxiliary-stage pole pieces joined together via an auxiliary-stage joint member formed of a non-magnetic material, and a specimen stage disposing surface where said plurality of auxiliary-stage pole pieces and said auxiliary-stage joint member are exposed; and an auxiliary-stage permanent magnet rotatably inserted within said auxiliary stage where said plurality of auxiliary-stage pole pieces are joined, said specimen stage being disposed upon said specimen stage disposing surface of said auxiliary stage.

18. A tunnel unit according to claim 17 further comprising an electrically insulating portion disposed between said specimen stage disposing surface of said auxiliary stage and said specimen stage for mutually electrically insulating these members.

19. A tunnel unit according to claim 18 wherein said electrically insulating portion has adhesive characteristics.

20. A tunnel unit according to claim 17 further comprising a notch formed in the lower end face of said auxiliary stage extending along said auxiliary-stage joint member.

21. A tunnel unit according to claim 20 further comprising a magnetically permeable electrically insulating portion provided on the portion of said lower end face of said auxiliary stage that is not occupied by said notch.

22. A tunnel unit according to claim 1 further comprising a lubricant provided at the joint of and between said permanent magnet and said pole pieces.

23. A tunnel unit according to claim 17 further comprising an auxiliary-stage lubricant provided at the joint of and between said auxiliary-stage permanent magnet and said auxiliary-stage pole pieces.

24. A tunnel unit according to claim 2 wherein said screws comprise micrometers.

25. A tunnel unit according to claim 24 wherein said micrometers are provided with click-generating knobs.

26. A tunnel unit according to claim 9 further comprising a plurality of grooves formed at equal intervals in the outer periphery of the end portion of said first screw and extending parallel to the axis of said first screw.

27. A tunnel unit according to claim 6 further comprising a plurality of grooves formed at equal intervals in the outer periphery of said metal sphere and extending parallel with the axis of rotation said first screw.

28. A tunnel unit according to claim 1 wherein said scanning head comprises a scanning head main body on which said piezoelectric element and said probe are disposed, and a head adapter on which said screw means is disposed said scanning head main body.

29. A tunnel unit according to claim 28 wherein said head adapter includes a screw socket for supporting said scanning head main body.

30. A tunnel unit according to claim 28 wherein said head adapter includes a collet chuck for supporting said scanning head main body.

31. A tunnel unit according to claim 1 further comprising a preamplifier provided in said scanning head for amplifying the tunnel current from said probe.

32. A tunnel unit according to claim 1 further comprising a display lamp provided on the outer side of said scanning head for indicating that the tunnel current from said probe has reached a set value.

33. A tunnel unit according to claim 1 further comprising an opening formed in said scanning head for observing said probe.

34. A tunnel unit according to claim 33 further comprising a notch formed in said scanning head for adjusting the distribution of the weight of said scanning head.

35. A scanning head for a scanning tunneling microscope comprising:
- a scanning head main body having an opening formed therein for observation;
- a piezoelectric element fixed to said scanning head main body and disposed inside said scanning head main body;
- a probe mounted on said piezoelectric element and disposed in the vicinity of said opening of said scanning head main body; and
- an observation window body provided in said opening of said scanning head main body for closing said opening, said observation window body being optically transparent and capable of preventing the inside of said scanning main body from being subjected to external disturbance.

36. A scanning head according to claim 35 wherein said observation window body shuts out sound waves propagating inwardly from the exterior.

37. A scanning head according to claim 36, wherein said observation window body includes a magnifying lens.

38. A scanning head according to claim 36, wherein said observation window body includes a magnifying lens and a condenser lens on the outer periphery of said magnifying lens.

39. A scanning head according to claim 36 further comprising a magnet fixed to the outer periphery of said observation window body and for holding said observation window body within said opening.

40. A scanning head according to claim 35, wherein said observation window body shuts out electromagnetic waves propagating inwardly from the exterior.

41. A scanning head according to claim 40 wherein said observation window body has a window main body and a shield provided on said window main body for shutting out electromagnetic waves.

42. A scanning head according to claim 35 wherein said observation window body has a window main body and an illuminating lamp fixed to said window main body.

* * * * *

UNITED STATES PATENT AND TRADEMARK OFFICE
CERTIFICATE OF CORRECTION

PATENT NO. : 4,947,042

DATED : August 7, 1990

INVENTOR(S) : Nishioka et al.

It is certified that error appears in the above-identified patent and that said Letters Patent is hereby corrected as shown below:

Column 20, line 49, after "disposed" insert --for supporting--.

Signed and Sealed this

Twenty-sixth Day of November, 1991

Attest:

HARRY F. MANBECK. JR.

Attesting Officer

Commissioner of Patents and Trademarks